United States Patent
Joshi et al.

(10) Patent No.: US 9,842,053 B2
(45) Date of Patent: Dec. 12, 2017

(54) SYSTEMS AND METHODS FOR PERSISTENT CACHE LOGGING

(71) Applicant: SanDisk Technologies LLC, Plano, TX (US)

(72) Inventors: Vikram Joshi, Los Gatos, CA (US); Yang Luan, San Jose, CA (US); Michael F. Brown, Campbell, CA (US); Bhavesh Mehta, Mountain View, CA (US)

(73) Assignee: SanDisk Technologies LLC, Plano, TX (US)

( * ) Notice: Subject to any disclaimer, the term of this patent is extended or adjusted under 35 U.S.C. 154(b) by 111 days.

(21) Appl. No.: 13/837,210

(22) Filed: Mar. 15, 2013

(65) Prior Publication Data

US 2014/0281131 A1    Sep. 18, 2014

(51) Int. Cl.
*G06F 12/0868* (2016.01)
*G06F 12/0804* (2016.01)
*G06F 12/0871* (2016.01)

(52) U.S. Cl.
CPC ...... *G06F 12/0868* (2013.01); *G06F 12/0804* (2013.01); *G06F 12/0871* (2013.01); *G06F 2212/313* (2013.01); *G06F 2212/466* (2013.01)

(58) Field of Classification Search
CPC .... G06F 3/0628; G06F 3/0688; G06F 12/127; G06F 12/0871; G06F 12/0891
USPC .................. 709/229, 249; 713/150, 189, 193
See application file for complete search history.

(56) References Cited

U.S. PATENT DOCUMENTS

| 4,571,674 | A | 2/1986 | Hartung |
| 5,043,871 | A | 8/1991 | Nishigaki et al. |
| 5,193,184 | A | 3/1993 | Belsan et al. |
| 5,261,068 | A | 11/1993 | Gaskins et al. |

(Continued)

FOREIGN PATENT DOCUMENTS

| CN | 1771495 | 5/2006 |
| EP | 1100001 | 5/2001 |

(Continued)

OTHER PUBLICATIONS

Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.

(Continued)

*Primary Examiner* — Reba I Elmore
(74) *Attorney, Agent, or Firm* — Stoel Rives, LLP

(57) ABSTRACT

A cache log module stores an ordered log of cache storage operations sequentially within the physical address space of a non-volatile storage device. The log may be divided into segments, each comprising a set of log entries. Data admitted into the cache may be associated with respective log segments. Cache data may be associated with the log segment that corresponds to the cache storage operation in which the cache data was written into the cache. The backing store of the data may be synchronized to a particular log segment by identifying the cache data pertaining to the segment (using the associations), and writing the identified data to the backing store. Data lost from the cache may be recovered from the log by, inter alia, committing entries in the log after the last synchronization time of the backing store.

23 Claims, 12 Drawing Sheets

(56) References Cited

U.S. PATENT DOCUMENTS

| | | | |
|---|---|---|---|
| 5,291,496 A | 3/1994 | Andaleon et al. |
| 5,307,497 A | 4/1994 | Feigenbaum et al. |
| 5,313,475 A | 5/1994 | Cromer et al. |
| 5,325,509 A | 6/1994 | Lautzenheiser |
| 5,392,427 A | 2/1995 | Barrett et al. |
| 5,404,485 A | 4/1995 | Ban |
| 5,434,994 A | 7/1995 | Shaheen et al. |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,551,003 A | 8/1996 | Mattson et al. |
| 5,553,261 A | 9/1996 | Hasbun et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Nijima et al. |
| 5,603,001 A | 2/1997 | Sukegawa et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,734,861 A | 3/1998 | Cohn et al. |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,845,313 A | 12/1998 | Estakhri et al. |
| 5,845,329 A | 12/1998 | Onishi et al. |
| 5,860,083 A | 1/1999 | Sukegawa |
| 5,907,856 A | 5/1999 | Estakhri et al. |
| 5,924,113 A | 7/1999 | Estakhri et al. |
| 5,930,815 A | 7/1999 | Estakhri et al. |
| 5,957,158 A | 9/1999 | Volz et al. |
| 5,960,462 A | 9/1999 | Solomon et al. |
| 5,961,660 A | 10/1999 | Capps, Jr. et al. |
| 6,000,019 A | 12/1999 | Dykstal et al. |
| 6,014,724 A | 1/2000 | Jennett |
| 6,073,232 A | 6/2000 | Kroeker et al. |
| 6,075,938 A * | 6/2000 | Bugnion ............... G06F 9/544 703/27 |
| 6,101,601 A | 8/2000 | Matthews et al. |
| 6,115,703 A | 9/2000 | Bireley et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,266,785 B1 | 7/2001 | McDowell |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,883 B1 | 1/2003 | Bello et al. |
| 6,507,911 B1 | 1/2003 | Langford |
| 6,516,380 B2 | 2/2003 | Kenchammana-Hoskote et al. |
| 6,523,102 B1 | 2/2003 | Dye et al. |
| 6,564,285 B1 | 5/2003 | Mills et al. |
| 6,567,889 B1 | 5/2003 | DeKoning et al. |
| 6,587,915 B1 | 7/2003 | Kim |
| 6,587,937 B1 | 7/2003 | Jensen et al. |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,675,349 B1 | 1/2004 | Chen |
| 6,715,027 B2 | 3/2004 | Kim et al. |
| 6,715,046 B1 | 3/2004 | Shoham et al. |
| 6,728,851 B1 | 4/2004 | Estakhri et al. |
| 6,742,082 B1 | 5/2004 | Lango et al. |
| 6,751,155 B2 | 6/2004 | Gorobets |
| 6,754,774 B2 | 6/2004 | Gruner et al. |
| 6,757,800 B1 | 6/2004 | Estakhri et al. |
| 6,766,413 B2 | 7/2004 | Newman |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,776 B2 | 8/2004 | Arimilli et al. |
| 6,785,785 B2 | 8/2004 | Piccirillo et al. |
| 6,801,979 B1 | 10/2004 | Estakhri |
| 6,804,755 B2 | 10/2004 | Selkirk et al. |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,925,533 B2 | 8/2005 | Lewis |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,036,040 B2 | 4/2006 | Nicholson et al. |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,069,393 B2 | 6/2006 | Miyata et al. |
| 7,073,028 B2 | 7/2006 | Lango et al. |
| 7,076,560 B1 | 7/2006 | Lango et al. |
| 7,076,599 B2 | 7/2006 | Aasheim et al. |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,143,228 B2 | 11/2006 | Lida et al. |
| 7,149,947 B1 | 12/2006 | MacLellan et al. |
| 7,155,531 B1 | 12/2006 | Lango et al. |
| 7,167,953 B2 | 1/2007 | Megiddo et al. |
| 7,171,536 B2 | 1/2007 | Chang et al. |
| 7,173,852 B2 | 2/2007 | Gorobets et al. |
| 7,178,081 B2 | 2/2007 | Lee et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,197,657 B1 | 3/2007 | Tobias |

(56) References Cited

U.S. PATENT DOCUMENTS

| | | |
|---|---|---|
| 7,203,815 B2 | 4/2007 | Haswell |
| 7,215,580 B2 | 5/2007 | Gorobets |
| 7,219,238 B2 | 5/2007 | Saito et al. |
| 7,234,082 B2 | 6/2007 | Lai et al. |
| 7,243,203 B2 | 7/2007 | Scheuerlein |
| 7,246,179 B2 | 7/2007 | Camara et al. |
| 7,254,686 B2 | 8/2007 | Islam |
| 7,260,820 B1 | 8/2007 | Waldspurger et al. |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voight et al. |
| 7,337,201 B1 | 2/2008 | Yellin et al. |
| 7,340,558 B2 | 3/2008 | Lee et al. |
| 7,340,566 B2 | 3/2008 | Voth et al. |
| 7,356,651 B2 | 4/2008 | Liu et al. |
| 7,360,015 B2 | 4/2008 | Matthews et al. |
| 7,360,037 B2 | 4/2008 | Higaki et al. |
| 7,366,808 B2 | 4/2008 | Kano et al. |
| 7,392,365 B2 | 6/2008 | Selkirk et al. |
| 7,395,384 B2 | 7/2008 | Sinclair et al. |
| 7,398,348 B2 | 7/2008 | Moore et al. |
| 7,424,593 B2 | 9/2008 | Estakhri et al. |
| 7,437,510 B2 | 10/2008 | Rosenbluth et al. |
| 7,441,090 B2 | 10/2008 | Estakhri et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansai et al. |
| 7,500,000 B2 | 3/2009 | Groves et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,549,022 B2 | 6/2009 | Baker |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,617,375 B2 | 11/2009 | Flemming et al. |
| 7,620,773 B2 | 11/2009 | Nicholson et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,660,941 B2 | 2/2010 | Lee et al. |
| 7,664,239 B2 | 2/2010 | Groff et al. |
| 7,669,019 B2 | 2/2010 | Fujibayashi et al. |
| 7,673,108 B2 | 3/2010 | Iyengar et al. |
| 7,676,628 B1 | 3/2010 | Compton et al. |
| 7,685,367 B2 | 3/2010 | Ruia et al. |
| 7,694,065 B2 | 4/2010 | Petev et al. |
| 7,702,873 B2 | 4/2010 | Griess et al. |
| 7,721,047 B2 | 5/2010 | Dunshea et al. |
| 7,721,059 B2 | 5/2010 | Mylly et al. |
| 7,725,628 B1 | 5/2010 | Phan et al. |
| 7,801,894 B1 | 9/2010 | Bone et al. |
| 7,805,449 B1 | 9/2010 | Bone et al. |
| 7,831,783 B2 | 11/2010 | Pandit et al. |
| 7,831,977 B2 | 11/2010 | Shultz et al. |
| 7,853,772 B2 | 12/2010 | Chang et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |
| 7,917,803 B2 | 3/2011 | Stefanus et al. |
| 7,941,591 B2 | 5/2011 | Aviles |
| 7,984,230 B2 | 7/2011 | Nasu et al. |
| 8,046,526 B2 | 10/2011 | Yeh |
| 8,055,820 B2 | 11/2011 | Sebire |
| 8,060,683 B2 | 11/2011 | Shultz et al. |
| 8,095,764 B1 | 1/2012 | Bauer et al. |
| 8,127,103 B2 | 2/2012 | Kano et al. |
| 8,135,900 B2 | 3/2012 | Kunimatsu et al. |
| 8,135,904 B2 | 3/2012 | Lasser et al. |
| 8,151,077 B1 | 4/2012 | Bauer et al. |
| 8,151,082 B2 | 4/2012 | Flynn et al. |
| 8,171,201 B1 * | 5/2012 | Edwards, Sr. .................. 711/6 |
| 8,171,204 B2 | 5/2012 | Chow et al. |
| 8,195,929 B2 | 6/2012 | Banga et al. |
| 8,214,583 B2 | 7/2012 | Sinclair et al. |
| 8,244,935 B2 | 8/2012 | Leventhal et al. |
| 8,479,294 B1 | 7/2013 | Li et al. |
| 8,549,222 B1 | 10/2013 | Kleiman et al. |
| 2002/0069317 A1 | 6/2002 | Chow et al. |
| 2002/0069318 A1 | 6/2002 | Chow et al. |
| 2002/0103819 A1 | 8/2002 | Duvillier |
| 2002/0161855 A1 | 10/2002 | Manczak et al. |
| 2002/0181134 A1 | 12/2002 | Bunker et al. |
| 2002/0188711 A1 | 12/2002 | Meyer et al. |
| 2002/0194451 A1 | 12/2002 | Mukaida et al. |
| 2003/0061296 A1 | 3/2003 | Craddock et al. |
| 2003/0061550 A1 | 3/2003 | Ng et al. |
| 2003/0093741 A1 | 5/2003 | Argon et al. |
| 2003/0140051 A1 | 7/2003 | Fujiwara et al. |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2004/0002942 A1 | 1/2004 | Pudipeddi et al. |
| 2004/0003002 A1 | 1/2004 | Adelmann |
| 2004/0049564 A1 | 3/2004 | Ng et al. |
| 2004/0093463 A1 | 5/2004 | Shang |
| 2004/0117586 A1 | 6/2004 | Estakhri et al. |
| 2004/0148360 A1 | 7/2004 | Mehra et al. |
| 2004/0153694 A1 | 8/2004 | Nicholson et al. |
| 2004/0186946 A1 | 9/2004 | Lee |
| 2004/0205177 A1 | 10/2004 | Levy et al. |
| 2004/0225837 A1 | 11/2004 | Lewis |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0055425 A1 | 3/2005 | Lango et al. |
| 2005/0055497 A1 | 3/2005 | Estakhri et al. |
| 2005/0076107 A1 | 4/2005 | Goud et al. |
| 2005/0120177 A1 | 6/2005 | Black |
| 2005/0132259 A1 | 6/2005 | Emmot et al. |
| 2005/0141313 A1 | 6/2005 | Gorobets et al. |
| 2005/0144361 A1 | 6/2005 | Gonzalez et al. |
| 2005/0144406 A1 | 6/2005 | Chong, Jr. |
| 2005/0149618 A1 | 7/2005 | Cheng |
| 2005/0149683 A1 | 7/2005 | Chong, Jr. et al. |
| 2005/0149819 A1 | 7/2005 | Hwang |
| 2005/0177672 A1 | 8/2005 | Rao |
| 2005/0177687 A1 | 8/2005 | Rao |
| 2005/0193166 A1 | 9/2005 | Johnson et al. |
| 2005/0216653 A1 | 9/2005 | Aasheim et al. |
| 2005/0223005 A1 * | 10/2005 | Shultz ..................... G06F 9/526 |
| 2005/0229090 A1 | 10/2005 | Shen et al. |
| 2005/0240713 A1 | 10/2005 | Wu et al. |
| 2005/0246510 A1 | 11/2005 | Retnamana et al. |
| 2005/0257017 A1 | 11/2005 | Yagi |
| 2005/0257213 A1 | 11/2005 | Chu et al. |
| 2005/0273476 A1 | 12/2005 | Wertheimer et al. |
| 2005/0276092 A1 | 12/2005 | Hansen et al. |
| 2006/0004955 A1 | 1/2006 | Ware et al. |
| 2006/0015769 A1 * | 1/2006 | Ikeuchi ............... G06F 11/1004 714/6.22 |
| 2006/0020744 A1 | 1/2006 | Sinclair et al. |
| 2006/0026339 A1 | 2/2006 | Rostampour |
| 2006/0041731 A1 | 2/2006 | Jochemsen et al. |
| 2006/0053157 A1 | 3/2006 | Pitts |
| 2006/0059326 A1 | 3/2006 | Aasheim et al. |
| 2006/0075057 A1 | 4/2006 | Gildea et al. |
| 2006/0085626 A1 | 4/2006 | Roberson et al. |
| 2006/0090048 A1 | 4/2006 | Okumoto et al. |
| 2006/0106968 A1 | 5/2006 | Wooi Teoh |
| 2006/0117212 A1 | 6/2006 | Meyer et al. |
| 2006/0123197 A1 | 6/2006 | Dunshea et al. |
| 2006/0129778 A1 | 6/2006 | Clark et al. |
| 2006/0136657 A1 | 6/2006 | Rudelic et al. |
| 2006/0136685 A1 | 6/2006 | Griv et al. |
| 2006/0143396 A1 | 6/2006 | Cabot |

(56) References Cited

U.S. PATENT DOCUMENTS

| | | |
|---|---|---|
| 2006/0149893 A1 | 7/2006 | Barfuss et al. |
| 2006/0152981 A1 | 7/2006 | Ryu |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0224849 A1 | 10/2006 | Islam et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2006/0271740 A1 | 11/2006 | Mark et al. |
| 2007/0006021 A1 | 1/2007 | Nicholson et al. |
| 2007/0016699 A1 | 1/2007 | Minami |
| 2007/0016754 A1 | 1/2007 | Testardi |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050548 A1 | 3/2007 | Bali et al. |
| 2007/0050571 A1 | 3/2007 | Nakamura et al. |
| 2007/0061508 A1 | 3/2007 | Zweighaft |
| 2007/0069318 A1 | 3/2007 | Takeuchi et al. |
| 2007/0086260 A1 | 4/2007 | Sinclair |
| 2007/0088666 A1 | 4/2007 | Saito |
| 2007/0118676 A1 | 5/2007 | Kano et al. |
| 2007/0118713 A1 | 5/2007 | Guterman et al. |
| 2007/0124474 A1 | 5/2007 | Margulis |
| 2007/0124540 A1 | 5/2007 | van Riel |
| 2007/0136555 A1 | 6/2007 | Sinclair |
| 2007/0143532 A1 | 6/2007 | Gorobets et al. |
| 2007/0143560 A1 | 6/2007 | Gorobets |
| 2007/0143566 A1 | 6/2007 | Gorobets |
| 2007/0143567 A1 | 6/2007 | Gorobets |
| 2007/0147356 A1 | 6/2007 | Malas et al. |
| 2007/0150689 A1 | 6/2007 | Pandit et al. |
| 2007/0156998 A1 | 7/2007 | Gorobets |
| 2007/0168698 A1 | 7/2007 | Coulson et al. |
| 2007/0198770 A1 | 8/2007 | Horii et al. |
| 2007/0204128 A1 | 8/2007 | Lee et al. |
| 2007/0208790 A1 | 9/2007 | Reuter et al. |
| 2007/0214320 A1 | 9/2007 | Ruia et al. |
| 2007/0233455 A1 | 10/2007 | Zimmer et al. |
| 2007/0233937 A1 | 10/2007 | Coulson et al. |
| 2007/0250660 A1 | 10/2007 | Gill et al. |
| 2007/0260608 A1 | 11/2007 | Hertzberg et al. |
| 2007/0261030 A1 | 11/2007 | Wadhwa |
| 2007/0263514 A1 | 11/2007 | Iwata et al. |
| 2007/0266037 A1 | 11/2007 | Terry et al. |
| 2007/0271468 A1 | 11/2007 | McKenney et al. |
| 2007/0274150 A1 | 11/2007 | Gorobets |
| 2007/0276897 A1 | 11/2007 | Tameshige et al. |
| 2007/0294319 A1* | 12/2007 | Mankad ............. G06F 11/1662 |
| 2007/0300008 A1 | 12/2007 | Rogers et al. |
| 2008/0005748 A1 | 1/2008 | Mathew et al. |
| 2008/0010395 A1 | 1/2008 | Mylly et al. |
| 2008/0043769 A1 | 2/2008 | Hirai |
| 2008/0052377 A1 | 2/2008 | Light |
| 2008/0052477 A1 | 2/2008 | Lee et al. |
| 2008/0059752 A1 | 3/2008 | Serizawa |
| 2008/0091876 A1 | 4/2008 | Fujibayashi et al. |
| 2008/0098159 A1 | 4/2008 | Song |
| 2008/0104321 A1 | 5/2008 | Kamisetty et al. |
| 2008/0109090 A1 | 5/2008 | Esmaili et al. |
| 2008/0120469 A1 | 5/2008 | Kornegay |
| 2008/0126507 A1 | 5/2008 | Wilkinson |
| 2008/0126700 A1 | 5/2008 | El-Batal et al. |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0205286 A1 | 8/2008 | Li et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0271039 A1 | 10/2008 | Rolia et al. |
| 2008/0276040 A1 | 11/2008 | Moritoki |
| 2008/0294846 A1* | 11/2008 | Bali ................. G06F 12/0804 711/118 |
| 2008/0294847 A1 | 11/2008 | Maruyama et al. |
| 2008/0307160 A1* | 12/2008 | Humlicek ........... G06F 12/0804 711/113 |
| 2008/0307414 A1* | 12/2008 | Alpern et al. .................... 718/1 |
| 2009/0070526 A1 | 3/2009 | Tetrick |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0103203 A1* | 4/2009 | Yoshida ............. G06F 12/0871 360/75 |
| 2009/0125650 A1 | 5/2009 | Sebire |
| 2009/0125700 A1 | 5/2009 | Kisel |
| 2009/0132621 A1 | 5/2009 | Jensen et al. |
| 2009/0150599 A1 | 6/2009 | Bennett |
| 2009/0150605 A1 | 6/2009 | Flynn et al. |
| 2009/0150641 A1 | 6/2009 | Flynn et al. |
| 2009/0228637 A1 | 9/2009 | Moon |
| 2009/0248763 A1 | 10/2009 | Rajan et al. |
| 2009/0248922 A1 | 10/2009 | Hinohara et al. |
| 2009/0276588 A1 | 11/2009 | Murase |
| 2009/0276654 A1 | 11/2009 | Butterworth |
| 2009/0279556 A1* | 11/2009 | Selitser et al. ................. 370/401 |
| 2009/0287887 A1 | 11/2009 | Matsuki et al. |
| 2009/0292861 A1 | 11/2009 | Kanevsky et al. |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005072 A1 | 1/2010 | Pitts |
| 2010/0005228 A1 | 1/2010 | Fukutomi et al. |
| 2010/0017556 A1 | 1/2010 | Chin |
| 2010/0017568 A1 | 1/2010 | Wadhawan et al. |
| 2010/0023674 A1 | 1/2010 | Aviles |
| 2010/0023676 A1 | 1/2010 | Moon |
| 2010/0023682 A1 | 1/2010 | Lee et al. |
| 2010/0030946 A1 | 2/2010 | Kano et al. |
| 2010/0036840 A1 | 2/2010 | Pitts |
| 2010/0042805 A1 | 2/2010 | Recio et al. |
| 2010/0070701 A1 | 3/2010 | Iyigun et al. |
| 2010/0070725 A1 | 3/2010 | Prahlad et al. |
| 2010/0070747 A1 | 3/2010 | Iyigun et al. |
| 2010/0070982 A1 | 3/2010 | Pitts |
| 2010/0076936 A1 | 3/2010 | Rajan |
| 2010/0077194 A1 | 3/2010 | Zhao et al. |
| 2010/0082774 A1 | 4/2010 | Pitts |
| 2010/0095059 A1 | 4/2010 | Kisley et al. |
| 2010/0169542 A1 | 7/2010 | Sinclair |
| 2010/0174867 A1* | 7/2010 | Gill ................. G06F 12/0804 711/118 |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0217916 A1 | 8/2010 | Gao et al. |
| 2010/0228903 A1 | 9/2010 | Chandrasek et al. |
| 2010/0235597 A1 | 9/2010 | Arakawa |
| 2010/0246251 A1* | 9/2010 | Chen ................. G11C 11/16 365/171 |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2011/0022819 A1 | 1/2011 | Post et al. |

(56) References Cited

U.S. PATENT DOCUMENTS

| | | | |
|---|---|---|---|
| 2011/0107033 A1 | 5/2011 | Grigoriev et al. | |
| 2011/0153951 A1* | 6/2011 | Strumpen | G06F 12/0811 711/135 |
| 2011/0179162 A1 | 7/2011 | Mayo et al. | |
| 2011/0225342 A1 | 9/2011 | Sharma et al. | |
| 2011/0231857 A1 | 9/2011 | Zaroo et al. | |
| 2011/0238546 A1 | 9/2011 | Certain et al. | |
| 2011/0265083 A1 | 10/2011 | Davis | |
| 2011/0289267 A1* | 11/2011 | Flynn | G06F 1/183 711/103 |
| 2011/0314202 A1 | 12/2011 | Iyigun et al. | |
| 2011/0320733 A1 | 12/2011 | Sanford et al. | |
| 2012/0036325 A1* | 2/2012 | Mashtizadeh | G06F 12/0802 711/118 |
| 2012/0117562 A1* | 5/2012 | Jess | G06F 9/45558 718/1 |
| 2012/0131265 A1* | 5/2012 | Koltsidas | G06F 12/0868 711/103 |
| 2012/0159081 A1 | 6/2012 | Agrawal et al. | |
| 2012/0173824 A1 | 7/2012 | Iyigun et al. | |
| 2012/0254824 A1 | 10/2012 | Bansod | |
| 2012/0272240 A1* | 10/2012 | Starks | G06F 9/45533 718/1 |
| 2012/0278588 A1 | 11/2012 | Adams et al. | |
| 2012/0289258 A1* | 11/2012 | Hofstaedter | G06F 15/173 455/456.5 |
| 2012/0324183 A1* | 12/2012 | Chiruvolu | G06F 11/2038 711/162 |
| 2013/0042156 A1* | 2/2013 | Srinivasan | G06F 11/1443 714/54 |
| 2013/0185508 A1* | 7/2013 | Talagala | G06F 12/0888 711/118 |
| 2013/0191601 A1* | 7/2013 | Peterson | G06F 12/0893 711/137 |
| 2013/0232303 A1 | 9/2013 | Quan | |
| 2013/0263119 A1* | 10/2013 | Pissay et al. | 718/1 |
| 2013/0268719 A1* | 10/2013 | Dover | G06F 12/0246 711/103 |
| 2013/0275391 A1* | 10/2013 | Batwara | G06F 17/30085 707/689 |
| 2013/0318283 A1* | 11/2013 | Small | G06F 12/0246 711/103 |
| 2013/0326152 A1* | 12/2013 | Loaiza | G06F 11/2082 711/141 |
| 2013/0339958 A1 | 12/2013 | Droste et al. | |
| 2014/0136872 A1 | 5/2014 | Cooper et al. | |
| 2014/0156910 A1* | 6/2014 | Uttamchandani et al. | 711/103 |
| 2014/0156938 A1 | 6/2014 | Galchev et al. | |
| 2015/0178119 A1* | 6/2015 | Lee | G06F 9/45558 718/1 |

FOREIGN PATENT DOCUMENTS

| | | |
|---|---|---|
| EP | 1418502 | 5/2004 |
| EP | 1814039 | 3/2009 |
| GB | 123416 | 9/2001 |
| JP | 4242848 | 8/1992 |
| JP | 8153014 | 6/1996 |
| JP | 200259525 | 9/2000 |
| JP | 2009122850 | 6/2009 |
| WO | WO94/19746 | 9/1994 |
| WO | WO95/18407 | 7/1995 |
| WO | WO96/12225 | 4/1996 |
| WO | WO01/31512 | 5/2001 |
| WO | WO02/01365 | 1/2002 |
| WO | WO2004/061645 | 3/2004 |
| WO | WO2004/099989 | 11/2004 |
| WO | WO2005/103878 | 11/2005 |
| WO | WO2006/062511 | 6/2006 |
| WO | WO2006/065626 | 6/2006 |
| WO | WO2008/130799 | 3/2008 |
| WO | WO2008/073421 | 6/2008 |
| WO | WO2011/106394 | 9/2011 |

OTHER PUBLICATIONS

Adabas, Adabas Caching ASSO, DATA, WORK, http://communities.softw areag.com/web/guest/pwiki/-/wiki/Main/.../pop_up?_36_viewMode=print, Oct. 2008, accessed Aug. 3, 2012.
Adabas, Adabas Caching Configuration and Tuning, http://documentation.softwareag.com/adabas/ada821mfr/addons/acf/config/cfgover.htm, Sep. 2009, accessed Aug. 3, 2012.
Adabas, Adabas Caching Facility, http://www.softwareag.com/es/Images/Adabas_Caching_Facility_tcm24-71167.pdf, 2008, accessed Aug. 3, 2012.
Adabas, File Level Caching, http://documentation.softwareag.com/adabas/ada824mfr/addons/acf/services/file-level-caching.htm, accessed Aug. 3, 2012.
Agigatech, Bulletproof Memory for RAID Servers, Part 1, http://agigatech.com/blog/bulletproof-memory-for-raid-servers-part-1/, last visited Feb. 16, 2010.
Anonymous, "Method for Fault Tolerance in Nonvolatile Storage", http://ip.com, IP.com No. IPCOM000042269D, 2005.
Ari, "Performance Boosting and Workload Isolation in Storage Area Networks with SanCache," Hewlett Packard Laboratories, Proceedings of the 23rd IEEE / 14th SA Goddard Conference on Mass Storage Systems and Technologies (MSST 2006), May 2006, pp. 263-27.
Arpaci-Dusseau, "Removing the Costs of Indirection in Flash-based SSDs with Nameless Writes," Jun. 2010, HotStorage'10, Boston, MA.
Asine, "ASPMC-660 Rugged IDE Flash Drive PMC Module," http://www.asinegroup.com/products/aspmc660.html, copyright 2002, visited Nov. 8, 2009.
Atlantis Computing Technology, Caching, http://atlantiscomputing.com/technology/caching, published 2012, accessed Aug. 1, 2012.
Bandulet "Object-Based Storage Devices," Jul. 2007 http://developers.sun.com/solaris/articles/osd.htme, visited Dec. 1, 2011.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
BiTMICRO, "BiTMICRO Introduces E-Disk PMC Flash Disk Module at Military & aerospace Electronics East 2004," http://www. bitmicro.com/press.sub, published May 18, 2004, visited Mar. 8, 2011.
Bonnet, "Flash Device Support for Database Management," published Jan. 9, 2011.
Brandon, Jr., "Sparse Matrices in CS Education," Journal of Computing Sciences in Colleges, vol. 24 Issue 5, May 2009, pp. 93-98.
Casey, "San Cache: SSD in the San, "Storage Inc., http://www.solidata.com/resourses/pdf/storageing.pdf, 2000, visited May 20, 2011.
Casey, "Solid State File-Caching for Performance and Scalability," SolidData Quarter 1 2000, http://www/storagesearch. com/3dram.html visited May 20, 2011.
Citrix, XenServer-6.0.0 Installation Guide, Mar. 2, 2012, http://support.citrix.com/servlet/KbServlet/download/28750-102-673824/XenServer-6.0.0-installation.pdf. accessed Aug. 3, 2012.
Clustered Storage Solutions: "Products," http://www.clusteredstorage.com/clustered_storage_solutions.HTML, last visited Feb. 16, 2010.
Coburn, "NV-Heaps: Making Persistent Objects Fast and Safe with Next-Generation, Non-Volatile Memories", ACM 978-1-4503-0266-1/11/0, published Mar. 5, 2011.
Data Direct Networks, "White Paper: S2A9550 Overview," www.// datadirectnet. com, 2007.
EEEL-6892, Lecture 18, "Virtual Computers," Mar. 2010.
ELNEC, "NAND Flash Memories and Programming NAND Flash Memories Using ELNEC Device Programmers, Application Note," published Mar. 1, 2007.
Ferber, Christian, "XenDesktop and local storage + IntelliCache," Jun. 22, 2011, blogs.citrix.com/2011/06/22/xendesktop-and-local-storage-intellicache/, accessed Aug. 3, 2012.

(56) References Cited

OTHER PUBLICATIONS

Friedman, Mark, et al., "File Cache Performance and Tuning, Windows 2000 Performance Guide, O'Reilly & Associates, Inc., http://msdn.microsoft.com/en-us/ library/ms369863.aspx," published Jan. 2002, visited Aug. 3, 2012.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gill, "WOW: Wise Ordering for Writes—Combining Spatial and Temporal Locality in Non-Volatile Caches," IBM, Fast 05: 4th USENIX Conference on File and Storage Technologies, 2005.
Gutmann, "Secure Deletion of Data from Magnetic and Solid-State Memory", Usenix, 14 pages, San Jose, CA, published Jul. 1, 1996.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, Stmicroelectronics, "Open NAND Flash Interface Specification," Revision 2.0, Feb. 27, 2008.
Hystor "Making SSDs the Survival of the Fittest in High-Performance Storage Systems," ics10-Paper 102, Feb. 2010.
IBM, "Method to Improve Reliability of SSD Arrays," Nov. 2009.
Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Kawaguchi, "A Flash-Memory Based File System," TCON'95 Proceedings of the USENIX 1995 Technical Conference Proceedings, p. 13.
Linn, Craig, "Windows I/O Performance: Cache Manager and File System Considerations," CMGA Proceedings, Sep. 6, 2006.
Lu, Pin, "Virtual Machine Memory Access Tracing with Hypervisor Exclusive Cache," Departmentn of Computer Science, University of Rochester, 2007.
Mesnier, "Object-Based Storage," IEEE Communications Magazine, Aug. 2003, pp. 84-90.
Micron Technology, Inc., "NAND Flash 101: An Introduction to ND Flash and How to Design It in to Your Next Product (TN-29-19)," http://www.micron.com/~/media/Documents/Products/Technical%20Note/ND%20Flash/145tn2919_nd_101.pdf, 2006, visited May 10, 2010.
Micron, TN-29-08: Technical Note, "Hamming Codes for NAND Flash Memory Devices," Mar. 10, 2010.
Micron, "TN-29-17: NAND Flash Design and Use Considerations," Mar. 10, 2010.
Micron, "TN-29-42: Wear-Leveling Techniques in NAND Flash Devices," Mar. 10, 2010.
Microsoft, Data Set Management Commands Proposal for ATA8-ACS2, published Oct. 5, 2007, Rev. 3.
Microsoft, "File Cache Management, Windows Embedded CE6.0 R3," msdn.microsoft.com/en-us/subscriptions/aa911545.aspx, published Aug. 28, 2008.
Microsoft, "Filter Driver Development Guide," download.microsoft.com/.../FilterDriverDeveloperGuide.doc 2004.
Microsoft, "How NTFS Works," Apr. 9, 2010.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Muntz, et al., Multi-level Caching in Distributed File Systems, CITI Technical Report, 91-3, Aug. 16, 1991.
Nevex Virtual Technologies, "CacheWorks Data Sheet," http://www.nevex.com/wp-content/uploads/2010/12/Data-Sheet3.pdf, published Dec. 1, 2010.
Noll, Albert et al., Cell VM: A Homogeneous Virtual Machine Runtime System for a Heterogeneous Single-Chip.
Novell, "File System Primer", http://wiki.novell.com/index.php/File_System_Primer, 2006, visited Oct. 18, 2006.
Omesh Tickoo et al, Modeling Virtual Machine Performance: Challenges and Approaches, SIGMETRICS Perform. Eval. Rev. 37, 3 (Jan. 2010), 55-60. DOI=10.1145/1710115.1710126 http://doi.acm.org/10.1145/ 1710115.1710126.
Perfectcacheserver, "Automatic Disk Caching," http://www.raxco.com/business/perfectcache_server.aspx, last visited Oct. 31, 2012.
Pivot3, "Pivot3 announces IP-based storage cluster," www.pivot3._com, Jun. 22, 2007.
Plank, "A Tutorial on Reed-Solomon Coding for Fault Tolerance in RAID-like System," Department of Computer Science, University of Tennessee, pp. 995-1012, Sep. 1997.
Porter, "Operating System Transactions," ACM 978-1-60558-752-3/09/10, published Oct. 1, 2009.
Probert, "Windows Kernel Internals Cache Manager," Microsoft Corporation, http://www.i.u-tokyo.ac.jp/edu/ training/ss/lecture/new-documents/ Lectures/15-CacheManager/Cache Manager.pdf, printed May 15, 2010.
Ranaweera, 05-270RO, SAT: Write Same (10) command (41h), T10/05, Jul. 7, 2005, www.t10.org/ftp/t10/document.05/05-270r0.pdf, last visited Apr. 11, 2013.
Rosen, Richard, "IntelliCache, Scalability and consumer SSDs," blogs.citrix.com/2012/01/03/intellicache-scalability-and-consumer-ssds, Jan. 3, 2012, accessed Aug. 3, 2012.
Rosenblum, "The Design and Implementation of a Log-Structured File System," ACM Transactions on Computer Systems, vol. 10 Issue 1, Feb. 1992.
Samsung Electronics, "Introduction to Samsung's Linux Flash File System—RFS Application Note", Version 1.0, Nov. 2006.
Seagate Technology LLC, "The Advantages of Object-Based Storage-Secure, Scalable, Dynamic Storage Devices, Seagate Research Technology Paper, TP-536" Apr. 2005.
Sears, "Stasis: Flexible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/Uploaded-Documents/docs2008/e07154r6-Data$_{13}$ Set_Management_Proposal_for_ATA-ACS2.pdf, printed Apr. 5, 2010.
Singer, Dan, "Implementing MLC NAND Flash for Cost-Effective, High Capacity Memory," M-Systems, White Paper, 91-SR014-02-8L, Rev. 1.1, Sep. 2003.
Solid Data, Maximizing Performance through Solid State File-Caching, Best Practices Guide, http://soliddata.com/resources/pdf/bp-sybase.pdf, May 2000.
Spansion, "Data Management Software (DMS) for AMD Simultaneous Read/Write Flash Memory Devices", published Jul. 7, 2003.
Spillane, "Enabling Transactional File Access via Lightweight Kernel Extensions", Stony Brook University, IBM T. J. Watson Research Center, published Feb. 25, 2009.
State Intellectual Property Office, Office Action, CN Application No. 200780050970.0, dated Jun. 29, 2011.
State Intellectual Property Office, Office Action, CN Application No. 200780050970.0, dated Oct. 28, 2010.
State Intellectual Property Office, Office Action, CN Application No. 200780051020.X, dated Nov. 11, 2010.
State Intellectual Property Office, Office Action, CN Application No. 200780050983.8, dated May 18, 2011.
State Intellectual Property Office, Office Action, CN Application No. 200780051020.X, dated Jul. 6, 2011.

(56) References Cited

OTHER PUBLICATIONS

State Intellectual Property Office, Office Action, CN Application No. 200780051020.X, dated Nov. 7, 2011.
State Intellectual Property Office, Office Action, CN Application No. 200780050970.0, dated Jan. 5, 2012.
Steere, David et al., Efficient User-Level File Cache Management on the Sun Vnode Interface, School of Computer Science, Carnegie Mellon University, Apr. 18, 1990.
Superspeed, "New Super Cache 5 on Servers," http://www.superspeed.com/servers/supercache.php, last visited Oct. 31, 2013.
Tal, "NAND vs. NOR Flash Technology," M-Systems, www2.electronicproducts.com/PrintArticle.aspx?ArticleURL=FEBMSY1.feb2002.html, visited Nov. 22, 2010.
Terry et al., U.S. Appl. No. 60/797,127, "Filesystem-aware Block Storage System, Apparatus, and Method," filed May 3, 2006.
U.S., Interview Summary for U.S. Appl. No. 10/372,734, dated Feb. 28, 2006.
U.S., Notice of Allowance for U.S. Appl. No. 12/986,117, dated Apr. 4, 2013.
U.S., Notice of Allowance for U.S. Appl. No. 12/986,117 dated Jun. 5, 2013.
U.S., Office Action for U.S. Appl. No. 12/879,004 dated Feb. 25, 2013.
U.S., Office Action for U.S. Appl. No. 13/607,486 dated Jan. 10, 2013.
U.S., Office Action for U.S. Appl. No. 10/372,734, dated Sep. 1, 2005.
U.S., Office Action for U.S. Appl. No. 11/952,113, dated Dec. 15, 2010.
U.S., Office Action for U.S. Appl. No. 12/711,113, dated Jun. 6, 2012.
U.S., Office Action for U.S. Appl. No. 12/711,113, dated Nov. 23, 2012.
U.S., Office Action for U.S. Appl. No. 13,607,486 dated May 2, 2013.
U.S., Office Action for U.S. Appl. No. 13/118,237 dated Apr. 22, 2013.
U.S., Office Action, U.S. Appl. No. 11/952,109, dated May 1, 2013.
U.S., Office Action, U.S. Appl. No. 11/952,109, dated Nov. 29, 2011.
Van Hensbergen, IBM Research Report, "Dynamic Policy Disk Caching for Storage Networking," IBM Research Division, Computer Science, RC24123 (W0611-189), Nov. 28, 2006.
VMware, Introduction to VMware vSphere, http://www.vmware.com/pdf/vsphere4/r40/vsp_40_intro_vs.pdf, 2009, accessed Aug. 1, 2012.
VMware, Virtual Disk API Programming Guide, Virtual Disk Development Kit 1.2, Nov. 2010, accessed Aug. 3, 2012.
Volos, "Mnemosyne: Lightweight Persistent Memory", ACM 978-1-4503-0266-1/11/03, published Mar. 5, 2011.
Wacha, "Improving RAID-Based Storage Systems with Flash Memory," First Annual ISSDM/SRL Research Symposium, Oct. 20-21, 2009.
Walp, "System Integrated Flash Storage," Microsoft Corporation, 2008, http://download.microsoft.com/download/5/E/6/5E66B27B-988B-4F50-AF3A-C2FF1E62180F/COR-T559_WHO8.pptx, Printed Apr. 6, 2010, 8 pgs.
Wang, "OBFS: A File System for Object-based Storage Devices," Apr. 2004.
Wikipedia, "Object Storage Device," http://en.wikipedia.org/wiki/Object-storage-device, last visited Apr. 29, 2010.
Winnett, Brad, "S2A9550 Overview," White Paper, http://www.ddn.com/pdfs/ddn_s2a_9550_white_paper.pdf, Jul. 2006, 27 pgs.
WIPO, International Preliminary Report of Patentability for PCT/US2007/086691, dated Feb. 16, 2009.
WIPO, International Preliminary Report on Patentability for PCT/US2007/086688, dated Mar. 16, 2009.
WIPO, International Preliminary Report on Patentability for PCT/US2007/086701, dated Mar. 16, 2009.
WIPO, International Preliminary Report on Patentability for PCT/US2007/086687, dated Mar. 18, 2009.
WIPO, International Preliminary Report on Patentability for PCT/US2007/025048, dated Jun. 10, 2009.
WIPO, International Preliminary Report on Patentability for PCT/US2010/048325, dated Mar. 13, 2012.
WIPO, International Search Report and Written Opinion for PCT/US2007/086691, dated May 8, 2008.
WIPO, International Search Report and Written Opinion for PCT/US2007/025049, dated May 14, 2008.
WIPO, International Search Report and Written Opinion for PCT/US2007/025048, dated May 27, 2008.
WIPO, International Search Report and Written Opinion for PCT/US2007/086701, dated Jun. 5, 2008.
WIPO, International Search Report and Written Opinion for PCT/US2007/086687, dated Sep. 5, 2008.
WIPO, International Search Report and Written Opinion for PCT/US2011/65927, dated Aug. 28, 2012.
WIPO, International Search Report and Written Opinion for PCT/US2012/029722, dated Oct. 30, 2012.
WIPO, International Search Report and Written Opinion for PCT/US2012/039189, dated Dec. 27, 2012.
WIPO, International Search Report and Written Opinion PCT/US2010/025885, dated Sep. 28, 2011.
WIPO, International Search Report and Written Opinion PCT/US2012/050194, dated Feb. 26, 2013.
Woodhouse, David, "JFFS: The Journaling Flash File System," Red Hat, Inc., http://sourceware.org/jffs2/jffs2.pdf, visited Jun. 22, 2010.
Wright, "Extending ACID Semantics to the File System", ACM Transactions on Storage, vol. 3, No. 2, published May 1, 2011, pp. 1-40.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Yang, "A DCD Filter Driver for Windows NT 4," Proceedings of the 12th International Conference on Computer Applications in Industry and Engineering (CAINE-99), Atlanta, Georgia, USA, Nov. 4-6, 1999.
Yerrick, "Block Device," http://www.pineight.com/ds/block, last visited Mar. 1, 2010.
U.S., Office Action for U.S. Appl. No. 14/262,581 dated Jun. 19, 2014.
U.S., Office Action Interview Summary for U.S. Appl. No. 13/541,659 dated Aug. 26, 2014.
U.S., Office Action for U.S. Appl. No. 13/687,979 dated Sep. 9, 2014.
U.S., Office Action for U.S. Appl. No. 13/192,365 dated Jul. 17, 2014.
U.S., Office Action for U.S. Appl. No. 13/287,998 dated Jun. 10, 2014.
U.S., Office Action for U.S. Appl. No. 13/288,005 dated Jul. 8, 2014.

* cited by examiner

SYSTEMS AND METHODS FOR PERSISTENT CACHE LOGGING

TECHNICAL FIELD

This disclosure relates to input/output (I/O) infrastructure and, in particular, to a log-enabled cache.

BACKGROUND

Write-through cache implementations provide high levels of security, but can suffer performance problems in write-intensive environments. Write-back cache implementations can improve write performance, but may be subject to data loss in some certain failure modes.

SUMMARY

Disclosed herein are embodiments of a method for persistent cache logging. The disclosed methods may comprise one or more machine-executable operations and/or steps. The disclosed operations and/or steps may be embodied as program code stored on a computer readable storage medium. Accordingly, embodiments of the methods disclosed herein may be embodied as a computer program product comprising a computer readable storage medium storing computer usable program code executable to perform one or more method operations and/or steps.

Embodiments of the disclosed methods may comprise storing data directed to a backing store in a cache, recording an ordered sequence of log entries on a persistent storage medium, wherein each log entry corresponds to a set of one or more storage operations, and/or maintaining associations between data stored in the cache and the log entries, at least until the data stored in the cache is stored on the backing store.

In some embodiments, the method may further include identifying data stored in the cache that is associated with a selected one of a plurality of log periods, each log period comprising a set of one or more log entries and/or writing the identified data from the cache to the backing store. Some embodiments of the method may further include marking the backing store with an indicator of the selected log period in response to writing the identified data from the cache to the backing store.

The method may also comprise detecting a failure condition, which may result in the loss of cache data. In response, the method may comprise identifying a set of log entries in the log corresponding to data that has not been written to the backing store, and writing data from the identified set of log entries to the backing store. Identifying the set of log entries may comprise determining an indicator of a last log period committed to the backing store. In some embodiments, the method includes queuing write operations corresponding to the log entries in the identified set in a buffer, removing write operations made redundant by one or more other write operations from the buffer, and writing data to the backing store corresponding to the remaining write operations in the buffer. The method may be further configured to admit data of the access entries into the cache.

Disclosed herein are embodiments of an apparatus, which may comprise a storage request module configured to identify storage requests directed to a backing store, a cache storage module configured to write data to a cache in one or more cache write operations performed in response to the identified storage requests, and a log module configured to log the cache write operations on a non-volatile storage device, wherein the storage request module is configured to acknowledge completion of an identified storage request in response to logging a cache write operation corresponding to the identified storage request on the non-volatile storage device. The cache storage module may be configured to operate within a virtual machine and the log module may be configured to operate within a virtualization kernel.

The log module may be configured to store log entries corresponding to the identified storage requests sequentially within a physical address space of the non-volatile storage device. The log module may be further configured to divide the log into an ordered sequence of log segments, each log segment comprising a respective portion of the ordered log of cache write operations. The apparatus may further include a synchronization module configured to write data to the backing store, the data corresponding to the cache write operations within a selected one of the log segments. The synchronization module may be configured to combine a plurality of redundant cache write operations within the selected log segment that pertain to the same data identifier into a single, combined write operation to the backing store.

In some embodiments, the apparatus includes a log association module configured to maintain cache metadata configured to associate data stored in the cache with respective log segments corresponding to the cache write operations of the data. The synchronization module may be configured to identify cache data associated with the selected log segment by use of the cache metadata and to write the identified cache data to the backing store. The synchronization module may be configured to identify a last log segment committed to the backing store and to select the log segment to commit to the backing store based on the determined last log segment. The synchronization module may be further configured to record an indication that the selected log segment has been committed to the backing store in response to writing the identified cache data associated to the backing store. In some embodiments, the synchronization module is further configured to reclaim the selected log segment in response to writing the data corresponding to the cache write operations within the selected log segments.

The log may comprise an ordered sequence of entries, each entry corresponding to a respective cache write operation. The apparatus may include a recovery module configured to access the log entries from a starting entry in the log to a last entry in the log and to implement write operations corresponding to the accessed log entries, wherein the starting entry is identified based on a synchronization state of the backing store.

Disclosed herein are embodiments of a system, which may comprise a cache virtualization module configured to cache data of each of a plurality of virtual machines in a cache, a cache log module configured to maintain a persistent, ordered log of write operations performed on the cache within respective log intervals, and a cache management system of one of the plurality of virtual machines configured to associate cached data of the virtual machine with respective log intervals at least until the data stored in the cache is stored on the backing store.

In some embodiments, each of the plurality of virtual machines comprises a respective cache management system configured to manage cache data of the virtual machine, including mappings between virtual machine cache data and respective log intervals. The system may further include a log synchronization module configured to identify virtual machine cache data corresponding to one or more log periods by use of the cache management systems of the virtual machines and to the identified virtual machine cache data to a backing store. The one or more log periods may comprise a plurality of write operations pertaining to a particular logical identifier, and the cache management system may be configured to identify cache data corresponding to a most recent one of the plurality of write operations pertaining to the particular logical identifier within the one or more log periods.

The cache log module may be configured to provide an identifier of a current log period to the plurality of virtual machines, and the cache management systems may be configured to associate cache data corresponding to cache write requests with the provided identifier. In some embodiments, the cache log module is further configured to provide an updated identifier to a virtual machine response to incrementing the current log period before completion of a cache write request of the virtual machine. The cache management system may be configured to associate cache data of the write request with the updated identifier.

The cache virtualization module may be configured to indicate that a request to cache data of a virtual machine in the cache storage is complete in response to determining that an entry corresponding to the request is stored in the persistent, ordered log.

BRIEF DESCRIPTION OF THE DRAWINGS

This disclosure includes and references the accompanying drawings, which provide a more particular description of the embodiments disclosed herein. The disclosure, however, is not limited to the particular embodiments depicted in the figures. The teachings of the disclosure may be utilized and/or adapted to other embodiments and/or changes may be made to the disclosed embodiments, without departing from the scope of the disclosure.

DETAILED DESCRIPTION

Figure 1A:
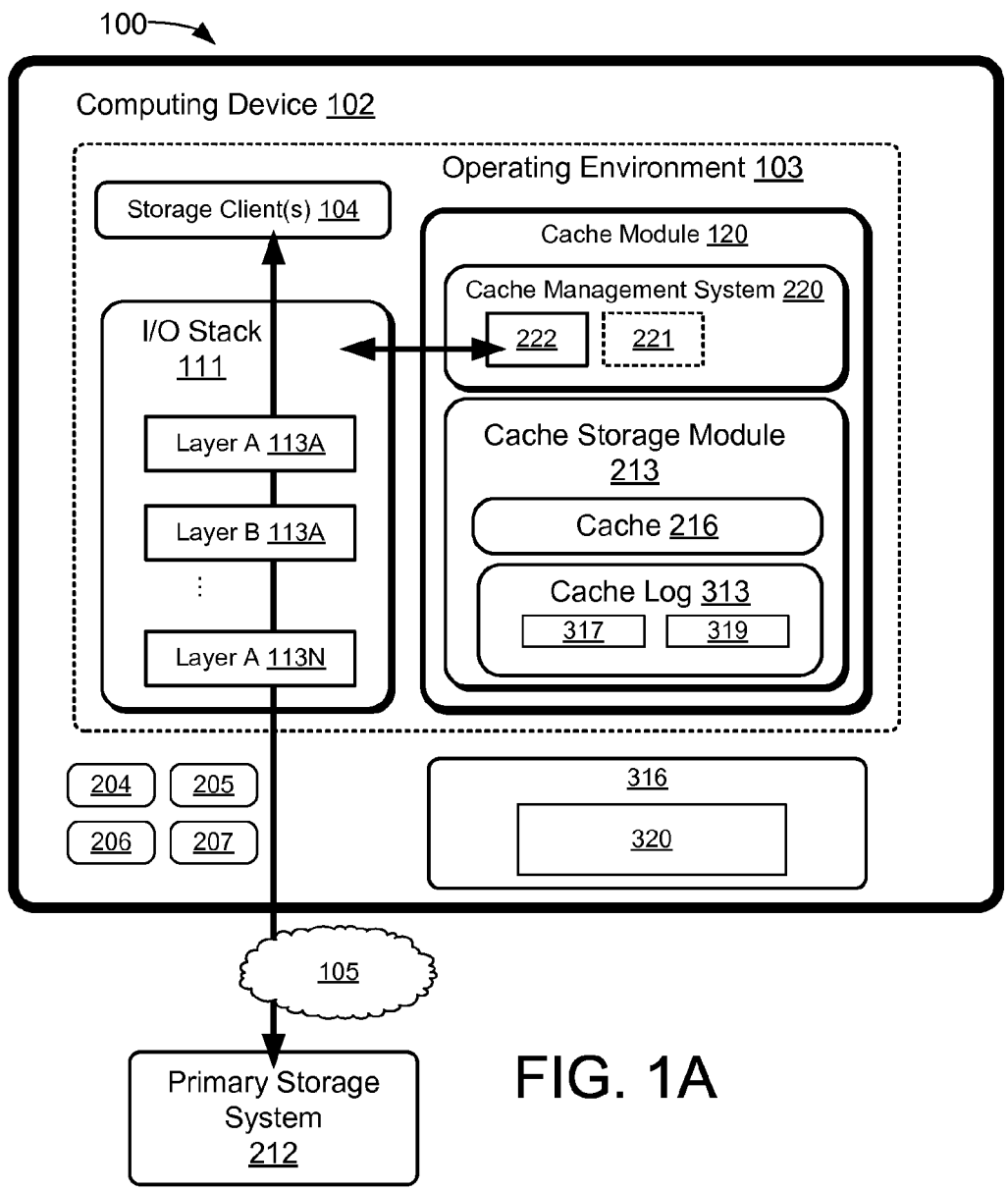
FIG. 1A is a block diagram of one embodiment of a system for persistent cache logging.

FIG. 1A depicts one embodiment of a system 100 for persistent caching. The system 100 may comprise a computing device 102. The computing device 102 may comprise processing resources 204, storage resources 205, memory resources 206, I/O resources 207, and the like. The processors 204 may comprise one or more general-purpose processing elements and/or cores, one or more special-purpose processing elements and/or cores (e.g., graphics processing resources), and the like. The storage resources 205 may comprise one or more machine-readable storage devices comprising persistent, machine-readable storage media, such as magnetic disk drives (hard disk drives), solid-state storage devices, optical storage devices, and the like. As used herein, a "solid-state storage device" or "solid-state memory device" refers to a non-volatile, persistent memory that can be repeatedly erased and reprogrammed. Accordingly, a solid-state memory device may comprise a solid-state storage device and/or solid-state storage drive (SSD) (e.g., a Flash storage device). The I/O resources 207 may include, but are not limited to: storage interface(s), file systems, wired network interfaces, wireless network interfaces, human-machine interfaces, and the like. The system 100 may further comprise a primary storage system 212, which may include, but is not limited to: one or more disk drives and/or other storage devices, one or more storage arrays, such as a Redundant Array of Inexpensive Disks ("RAID"), Just a Bunch of Disks ( "JBOD), or the like, network-attached storage, such as a network area storage ("NAS"), a storage area network ("SAN"), or the like. The primary storage system 212 may comprise one or more of the storage resources 205 of the computing device 102. Alternatively, or in addition, the primary storage system 212 may comprise one or more storage resources that are external to the computing device 102, such as network-accessible storage resources, including a NAS, SAN, or the like, as disclosed above. The cache module 120 may be configured to cache data of the primary storage system 212 and, as such, the primary storage system 212 may be a backing store of the cache 216.

The system 100 may comprise an operating environment 103 configured to manage hardware resources of the computing device 102, including the processing resources 204, storage resources 205, memory resources 206, and/or I/O resources 207 disclosed above. The operating environment 103 may comprise an operating system. In some embodiments, the operating environment 103 is a "bare metal" operating environment configured to directly manage hardware resources. In other embodiments, the operating environment 103 may be a virtualized operating environment configured to manage virtualized resources of a virtualization layer, such as a hypervisor, or the like.

The operating environment 103 may comprise one or more storage client(s) 104, which may include, but are not limited to: user-level applications, kernel-level applications, file systems, databases, and the like. The storage client(s) 104 may perform I/O operations by use of, inter alia, an I/O stack 111 of the operating environment 103. The I/O stack 111 may define a storage architecture in which storage services, such as file system drivers, volume drivers, disk drivers, and the like, are deployed. Storage services may be configured to interoperate by issuing and/or consuming I/O requests within various layers 113A-N of the I/O stack 111. The layers 113A-N may include, but are not limited to: a file layer, a volume layer, a disk layer, a SCSI layer, and so on.

The system 100 may comprise a cache module 120 configured to cache data of one or more of the storage clients 104. The cache module 120 may comprise a cache management system (CMS) 220, configured to manage cache operations within the operating environment 103, and a cache storage module 213 configured to manage cache resources, such as the cache 216. In some embodiments, CMS 220 may comprise a storage request module 222 configured to monitor I/O requests within the I/O stack 111. The CMS 220 may service selected I/O requests by use of the cache storage module 213, which may include, but is not limited to: admitting data into the cache 216, reading data from cache 216, and the like. As disclosed in further detail herein, admission into the cache may be determined by a cache policy and/or in accordance with the availability of cache resources.

The CMS 220 may be configured to manage cache operations by use of cache tags 221. As used herein, a "cache tag" refers to metadata configured to, inter alia, associate data that has been admitted into the cache with a storage location of the data within the cache 216. Accordingly, in some embodiments, cache tags 221 comprise mappings between data identifier(s) of the storage clients 104 (e.g., data identifiers, logical identifiers, logical addresses, primary storage addresses, and the like) and one or more cache storage locations. Accordingly, the cache tags 221 may comprise a translation layer between a namespace of a storage client 104, operating environment 103, and/or I/O stack 111 and the CMS 220. The cache tags 221 may represent an allocation of cache resources to a particular storage client 104, computing device 102, cache layer, and/or virtual machine (described in further detail below). Cache tags 221 may comprise cache metadata, such as access metrics, cache mode, and so on.

The cache storage module 213 may be configured to store data that has been admitted into the cache (e.g., by the CMS 220) within a cache 216. The cache 216 may comprise volatile storage resources (e.g., DRAM), battery-backed RAM, non-volatile storage media, solid-state storage media, and/or the like.

In some embodiments, the cache module 120 is configured to operate in a write-through cache mode. As used herein, a "write-through" cache mode refers to a cache mode in which data is admitted into the cache by: a) storing the data in cache 216 and b) writing the data to the primary storage system 212. The operation (and corresponding I/O request) may not be considered to be complete and/or acknowledged until the data is written to the primary storage system 212. Therefore, the critical path of a cache write operation may comprise one or more write operations to the primary storage system 212. Write operations to the primary storage system 212 may take considerably longer than write operations to the cache 216. The performance differential may be even greater under certain types of load conditions; for example, the performance of the primary storage system 212 may further degrade under highly random write conditions. As used herein, a "random" write operation refers to a storage operation to write data to an arbitrary physical storage location of a storage device (e.g., primary storage system 212). Therefore, although write-through cache modes may provide security against data loss, write performance can suffer. Moreover, write-through cache modes may cause scaling problems due to write overheads imposed by a large number of storage clients and/or caching systems (e.g., in a virtualized environment, such as a virtual desktop infrastructure (VDI) environment or the like).

Other cache modes may ameliorate certain write performance. In some embodiments, for example, the cache module 120 may be configured to implement a write-back or copy-back cache mode in which data is admitted into the cache without writing the data through to the primary storage system 212. Accordingly, the critical path of write operations may comprise writing data to the cache 216 rather than waiting for the data to be written to the primary storage system 212. Modified cache data (e.g. dirty data) may be written to the primary storage system 212 outside of the critical path of I/O requests. However, these types of cache modes may be susceptible to data loss, which may occur if the contents of the cache and/or cache metadata (e.g., cache tags 221) are lost before write-back operations to the primary storage system 212 are completed.

In some embodiments, the cache module 120 may be configured to implement a logged cache mode. As used herein, a logged cache mode refers to a cache mode in which write operations to the primary storage system 212 are deferred (e.g., performed outside of the critical path of the I/O requests) and cache data is secured against data loss. Cache data may be secured against loss by use of, inter alia, the cache log module 313. The cache log module 313 may be configured to maintain a log 320 of cache operations performed on the cache 216 on a persistent, non-volatile storage device 316. The log 320 may comprise a record of the ordered sequence of cache storage operations performed on the cache 216. Requests to write data into the cache may be acknowledged as complete in response to logging the write request (e.g., storing a record of the operation within the log 320) as opposed to writing the corresponding data to the primary storage system 212 as in a write-through cache mode. As disclosed in further detail below, the cache log module 313 may be configured to log cache storage operations in an ordered sequence, based on the temporal order of the cache storage operations, which may result in converting "random" write operations to various portions of a physical address space to more efficient sequential write operations.

Figure 1B:
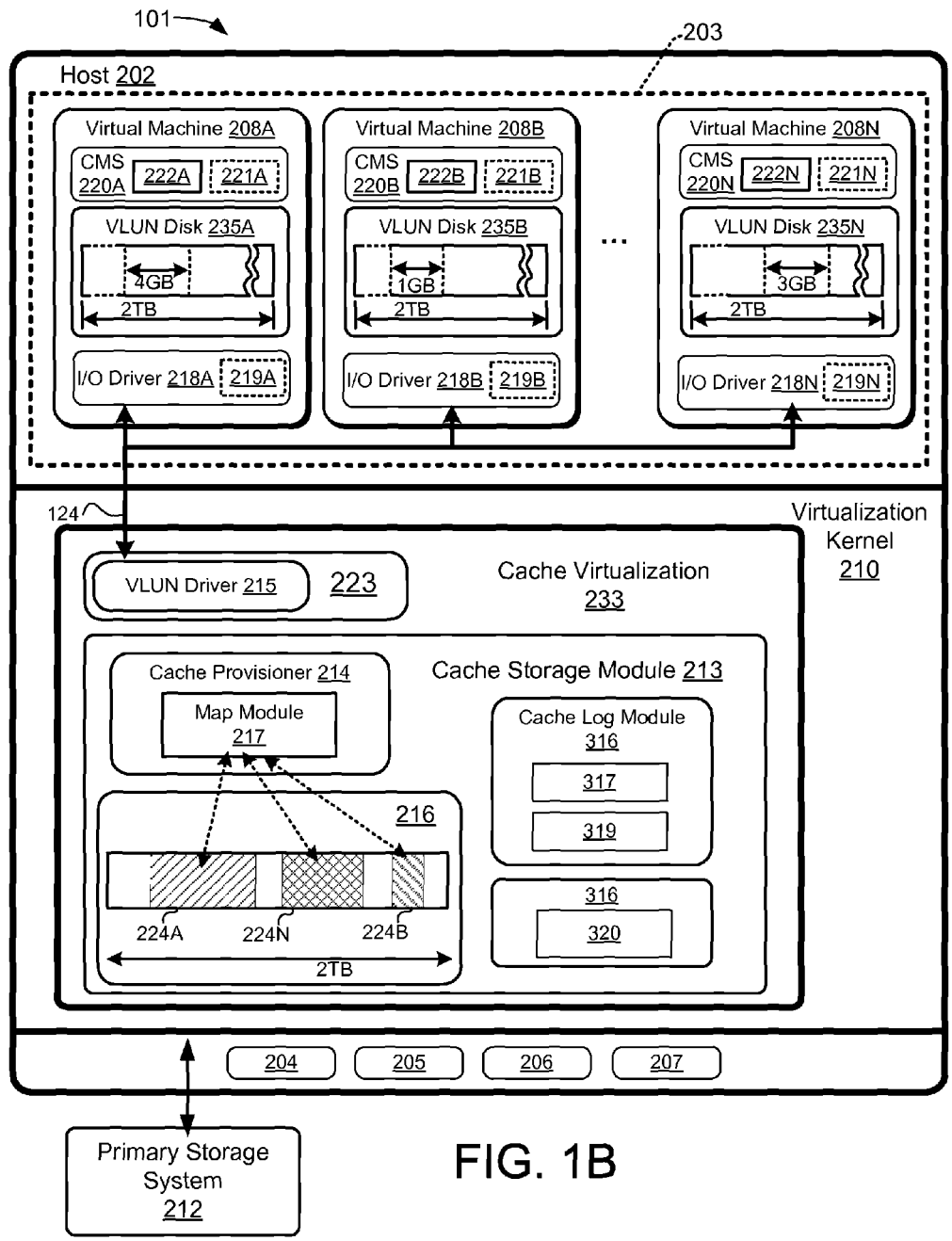
FIG. 1B is a block diagram of another embodiment of a system for persistent cache logging in a virtualized computing environment.
Figure 1C:
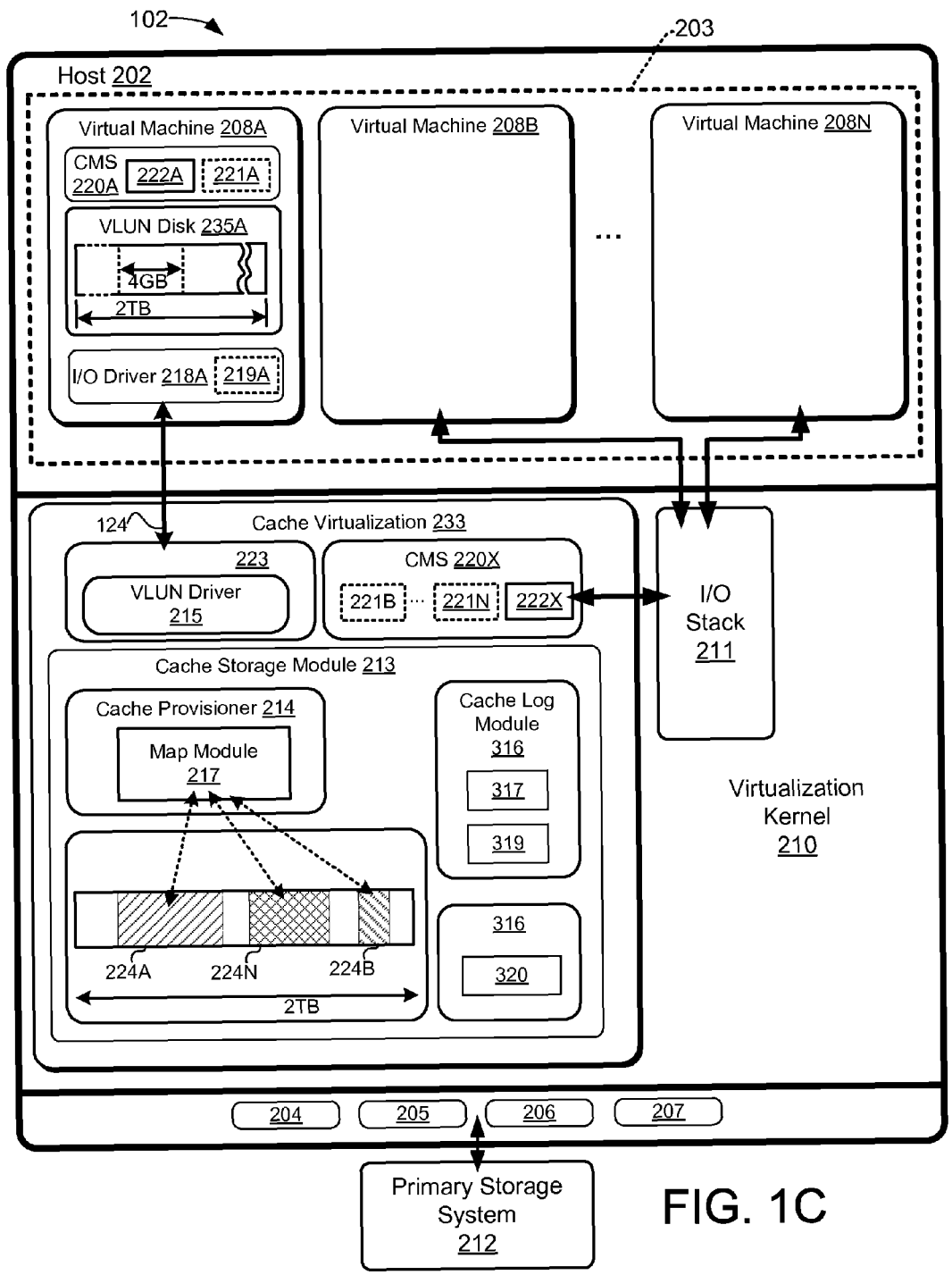
FIG. 1C is a block diagram of another embodiment of a system for persistent cache logging in a virtualized computing environment.

As disclosed above, FIG. 1A depicts an embodiment of a bare metal computing environment. The disclosure is not limited in this regard and could be adapted to other computing environments, such as virtualized computing environments as depicted in FIGS. 1B and 1C. FIG. 1B is a block diagram of another embodiment of a system 101 for cache logging. The system 101 may comprise a virtualized computing environment that includes a host 202 configured to include a virtualization kernel 210 (hypervisor) and user space 203. The user space 203 may comprise a plurality of virtual machines 208A-N. As used herein, a "virtual machine" refers to a system and/or process operating within a virtualized computing environment (e.g., the virtualization kernel 210). A virtual machine 208A-N may, therefore, refer to a system platform including an operating system (e.g., a guest operating system). Alternatively, or in addition, a virtual machine 208A-N may refer to a particular process and/or program operating within a virtualized computing environment.

The host 202 may comprise one or more computing devices capable of hosting the virtual machines 208A-N. The host 202 may comprise, for example, processing resources 204, storage resources 205, memory resources 206, I/O resources 207, and the like, as disclosed above.

Although FIG. 1B depicts three virtual machines 208A-N, the disclosure is not limited in this regard; the embodiments disclosed herein could be adapted for use in virtualized computing environments that include any number of hosts 202 comprising any number of virtual machines 208A-N.

The virtualization kernel 210 may be configured to manage the operation of the virtual machines 208A-N operating on the host 202 as well as other components and services provided by the host 202. For example, the virtualization kernel 210 may be configured to handle various I/O operations associated with a primary storage system 212 or other I/O devices. The primary storage system 212 may be shared among the multiple virtual machines 208A-N and/or multiple hosts.

The system 101 may comprise a cache virtualization module 233 configured to provide caching services to the virtual machines 208A-N deployed on the host computing device 202. The cache virtualization module 233 may comprise a cache storage module 213, which may include a cache 216 and a cache log module 313, as disclosed above. The cache storage module 213 may further comprise a cache provisioner module 214 and map module 217. The cache provisioner module 214 may be configured to provision resources to the virtual machines 208A-N, which may comprise dynamically allocating cache resources and/or I/O operations (IOPS) to the virtual machines 208A-N. The cache provisioner module 214 may be configured to provide for sharing resources of the cache 216 between multiple virtual machines 208A-N.

In some embodiments, one or more of the virtual machines 208A-N may comprise an I/O driver 218A-N and a cache management system (CMS) 220A-N. The I/O driver 218A-N may be configured to intercept I/O operations of the associated virtual machine 208A-N (within respective I/O stacks 111 of the virtual machines 208A-N) and to direct the I/O operations to the corresponding CMS 220A-N for processing; selected I/O operations may be serviced using the cache virtualization module 233. In some embodiments, and as depicted in FIG. 1B, the I/O driver 218 may be in "close proximity" to the source of I/O operations of the virtual machines 208A-N (e.g., the I/O driver 218A-N may be deployed within the virtual machine 208A-N itself, and as such, does not have to access the virtualization kernel 210 and/or cross a virtual machine boundary to access information pertaining to virtual machine 208A-N I/O operations). In some embodiments, the I/O driver 218A-N may comprise and/or be implemented as a device driver (e.g., a device driver of respective guest operating systems of the virtual machines 208A-N). The I/O driver 218A-N may comprise a generic component that forms part of an operating system and a device-specific component. The I/O driver 218A-N may leverage I/O Application Programming Interfaces (APIs) published by the guest operating system (e.g., may be in the I/O "path" of the virtual machines 208A-N). The I/O driver 218A-N may comprise a filter driver 219A-N configured to monitor I/O request packets (IRP) of a Microsoft Windows® operating system. The disclosure is not limited in this regard, however, and may be applied to any suitable I/O framework of any operating system (e.g., Unix®, LINUX, OSX®, Solaris®, or the like) and/or virtualization kernel 210.

In some embodiments, the virtual machines 208A-N may be configured to be transferred and/or relocated between hosts 202. The systems, apparatus, and methods disclosed herein may provide for transferring a "cache operating state" between hosts 202. As used herein, "cache operating state" or "cache state" refers to a current working state of a cache, which may include, but is not limited to: cache metadata, such as cache admission information (e.g., cache tags 221), access metrics, and so on; cache data (e.g., the contents of a cache 216); and the like. Transferring a cache operating state may, therefore, comprise retaining cache state on a first host 202 and/or transferring the retained cache state (including cache metadata and/or cache data) to another, different host 202. The virtualization kernel 210 (or other virtualization layer) may be configured to prevent virtual machines that reference local resources of the host 202, such as local disk storage or the like, from being transferred. Accordingly, virtual machines 208A-N may be configured to access the cache 216 as a shared storage resource and/or in a way that does not prevent the virtual machines 208A-N from being transferred between hosts 202.

One or more of the virtual machines 208A-N may comprise a CMS 220A-N, which may be configured to manage cache resources provisioned to the virtual machine 208A-N. As disclosed above, the CMS 220A-N may be configured to maintain cache metadata, such as cache tags 221, to represent data that has been admitted into the cache 216. The cache tags 221 may be maintained within memory resources of the virtual machine 208A-N, such that the cache tags 221 are transferred with the virtual machine between hosts (208A-N). In other embodiments, and as depicted in FIG. 1C, cache tags 221B-N of one or more of the virtual machines 208B-N may be maintained within the virtualization kernel 210 (e.g., within the cache virtualization module 233).

The cache provisioner module 214 may be configured to dynamically provision cache resources to the virtual machines 208A-N. Cache allocation information associated with a particular virtual machine (e.g., Virtual Machine 208A) may be communicated to the corresponding virtual-machine CMS 220A-N via the I/O driver 218 and/or using another communication mechanism. In some embodiments, the cache provisioner module 214 is configured to maintain mappings between virtual machines 208A-N and respective cache storage locations allocated to the virtual machines 208A-N. The mappings may be used to secure cache data of the virtual machines 208A-N (e.g., by limiting access to the virtual machine 208A-N that is mapped to the cached data) and/or to provide for retaining and/or transferring cache data of one or more virtual machines 208A-N transferred from the host 202 to other, remote hosts.

The CMS 220A-N may be configured to maintain cache metadata, which may comprise cache tags 221A-N in accordance with the cache storage that has been allocated to the virtual machine 208A-N. The cache tags 221A-N may represent cache resources that have been allocated to a particular virtual machine 208A-N by the cache provisioner module 214. Cache tags that are "occupied" (e.g., are associated with valid cache data), may comprise mappings and/or associations between one or more identifiers of the data and corresponding cache resources. As used herein, an "identifier" of a cache tag 221A-N refers to an identifier used by the virtual machine 208A-N and/or storage client 104 to reference data that has been (or will be) stored in the cache 216. A cache tag identifier may include, but is not limited to: an address (e.g., a memory address, physical storage address, logical block address, etc., such as an address on the primary storage system 212), a name (e.g., file name, directory name, volume name, etc.), a logical identifier, a reference, or the like.

In some embodiments, the cache tags 221A-N represent a "working set" of a virtual machine 208A-N cache. As used herein, a "working set" of cache tags 221A-N refers to a set of cache tags corresponding to cache data that has been admitted and/or retained in the cache 216 by the CMS 220A-N through, inter alia, the application of one or more cache policies, such as cache admission policies, cache retention and/or eviction policies (e.g., cache aging metadata, cache steal metadata, least recently used (LRU), "hotness" and/or "coldness," and so on), cache profiling information, file- and/or application-level knowledge, and the like. Accordingly, the working set of cache tags 221A-N may represent the set of cache data that provides optimal I/O performance for the virtual machine 208A-N under certain operating conditions.

In some embodiments, the CMS 220A-N may be configured to preserve a "snapshot" of the current cache state, which may comprise persisting the cache tags 221A-N (and/or related cache metadata) in a non-volatile storage medium, such as the primary storage system 212, persistent cache storage device (e.g., cache 216), or the like. A snapshot may comprise all or a subset of the cache metadata of the CMS 220A-N (e.g., cache state), which may include, but is not limited to: the cache tags 221A-N, related cache metadata, such as access metrics, and so on. In some embodiments, a snapshot may further comprise "pinning" data in the cache 216, which may cause data referenced by the one or more cache tags 221 to be retained in the cache 216. Alternatively, the snapshot may reference only the data identifiers (e.g., cache tags 221A-N), and may allow the underlying cache data to be removed and/or evicted from the cache 216.

The CMS 220A-N may be configured to load a snapshot from persistent storage, and to use the snapshot to populate the cache tags 221A-N. A snapshot may be loaded as part of an initialization operation (e.g., cache warm-up) and/or in response to configuration and/or user preference. For example, the CMS 220A-N may be configured to load different snapshots that are optimized for particular application(s) and/or service(s). Loading a snapshot may further comprise requesting cache storage from the cache provisioner module 214, as disclosed herein. In some embodiments, the CMS 220A-N may load a subset of a snapshot if the virtual machine 208A-N cannot allocate sufficient cache space for the full snapshot.

The CMS 220A-N may be further configured to retain the cache tags 221A-N in response to relocating and/or transferring the virtual machine 208A-N to another host 202. Retaining the cache tags 221 may comprise maintaining the cache tags 221A-N in the memory of the virtual machine 208A-N and/or not invalidating the cache tags 221A-N. Retaining the cache tags 221A-N may further comprise requesting cache storage from the cache provisioner module 214 of the destination host in accordance with the retained cache tags 221A-N, and/or selectively adding and/or removing cache tags 221A-N in response to being allocated more or less cache storage on the destination host. In some embodiments, the CMS 220A-N may retain the cache tags 221A-N despite the fact that the cache data referenced by the cache tags 221A-N does not exist in the cache 216 of the new destination host. As disclosed in further detail below, the cache virtualization module 213 may be configured to populate the cache 216 with cache data from a previous host 202 of the virtual machine 208A-N (e.g., via a network transfer), and/or from a shared, primary storage system 212.

The cache 216 may comprise one or more non-volatile storage resources, such as a solid-state storage device and/or a portion thereof. The cache storage module 213 may logically partition the cache 216 into multiple chunks. As used herein a "chunk" refers to an arbitrarily sized portion of cache storage capacity; the cache 216 may be divided into any number of chunks having any size. Each cache chunk may comprise a plurality of pages, each of which may comprise one or more storage units (e.g., sectors). In a particular embodiment, each chunk may comprise 256 MB (megabytes) of storage capacity; a 2 TB (terabyte) cache storage device 216 divided into 256 MB chunks may comprise 8384 chunks.

The cache provisioner module 214 may provision cache resources to virtual machines 208A-N based upon, inter alia, the cache requirements of the virtual machines 208A-N, availability of cache resources, and so on. The cache resources allocated to a particular virtual machine 208A-N may change over time in accordance with the operating conditions of the virtual machine 208A-N. The cache provisioner module 214 may provision cache chunks to a virtual machine 208A-N, which may determine the cache capacity of that virtual machine 208A-N. For example, if two 256 MB chunks are assigned to a specific virtual machine 208A-N, that virtual machine's cache capacity is 512 MB. The cache provisioner module 214 may be further configured to provision cache resources to other entities, such as the de-duplication cache 260 (e.g., cache resources 269).

In some embodiments, cache resources are provisioned using a "thin provisioning" approach. A thin provisioning approach may be used where the virtual machines 208A-N are configured to operate with fixed-size storage resources and/or when changes to the reported size of a storage resource would result in error condition(s). The cache storage device 216 may be represented within the virtual machines 208A-N as a fixed-size resource (e.g., through a virtual disk or other I/O interface, such as the I/O driver 218 of FIG. 1B). The cache provisioner module 214 may dynamically allocate cache resources to the virtual machines 208A-N in accordance with changing I/O conditions. Regardless of the number of cache chunks actually allocated to a particular virtual machine 208A-N, the cache storage interface may appear to remain at a constant, fixed size, which may allow for dynamic cache reallocation without causing error conditions within the virtual machines 208A-N.

The cache virtualization module 233 may comprise a cache interface module 223 configured to manage access to cache storage module 213 by the virtual machines 208A-N. The cache interface module 233 may provide one or more communication links and/or interfaces 124 through which the cache storage module 213 may service I/O requests for the virtual machines 208A-N (by use of the cache virtualization module 233), communicate configuration and/or allocation information, and so on. In some embodiments, the cache interface module 223 is configured to communicate with the virtual machines 208A-N through a virtual disk and/or using Virtual Logical Unit Number (VLUN) driver 215. The VLUN driver 215 may be further configured to provide a communication link 124 between the virtual machines 208A-N and the cache storage module 213.

In some embodiments, the VLUN driver 215 is configured to represent dynamically provisioned cache resources as fixed-size VLUN disks 235A-N within the virtual machines 208A-N. In an exemplary embodiment, the cache 216 may comprise 2 TB of storage capacity. The cache provisioner 214 may allocate four gigabytes (4 GB) to the virtual machine 208A, one gigabyte (1 GB) to virtual machine 208B, three gigabytes (3 GB) to virtual machine 208N, and so on. As disclosed above, other virtual machines 208B-N on the host 202 may be allocated different amounts of cache resources, in accordance with the I/O requirements of the virtual machines 208B-N and/or the availability of cache resources. The VLUN driver 215 and VLUN disk 235A-N may be configured to represent the entire capacity of the cache device 216 to the virtual machines 208A-N (e.g., 2 TB) regardless of the actual allocation to the particular virtual machine 208A-N by the cache provisioner module 214. In addition, and as disclosed in further detail below, the physical cache resources 224A-N allocated to the virtual machine 208A may be discontiguous within the physical address space of the cache 216. The cache storage module 213 may further comprise a map module 217 configured to present the cache resources allocated to the virtual machines 208A-N as a contiguous range of virtual cache addresses, regardless of the location of the underlying physical storage resources.

As disclosed above, the CMS 220A-N may comprise an I/O driver 218A-N configured to monitor and/or filter I/O requests of the corresponding virtual machine 208A-N. The I/O driver 218A-N may be configured to forward the I/O requests to the CMS 220A-N, which may selectively service the I/O requests by use of the cache storage module 213. The I/O driver 218A-N may comprise a storage driver, such as a Windows Driver, or other storage driver adapted for use an operating system and/or operating environments. The I/O driver 218A-N may be configured to monitor requests within an I/O and/or storage stack of the virtual machine 208A-N (e.g., 110 stack 111). In some embodiments, the I/O driver 218A-N may further comprise an I/O filter 219A-N configured to monitor and/or service I/O requests directed to primary storage system 212 (and/or other storage resources). I/O requests directed to the primary storage system 212 may be serviced directly at the primary storage system 212 (non-cached) or may be serviced using the cache storage module 213, as disclosed herein.

The I/O filter 219A-N may comprise a SCSI filter configured to manage data transfers between physical and virtual entities (e.g., primary storage system 212, VLUN disk 235A-N, and/or the cache storage module 213). The I/O filter 219A-N may be configured to identify the VLUN disk 235A-N within the virtual machine 208A-N, and manage capacity changes implemented by, inter alia, the cache provisioning module 214 (via the VLUN driver 215). As disclosed above, the VLUN disk 235A-N may be a virtual disk configured to represent dynamically allocated cache resources within the virtual machines 208A-N as fixed-size storage resources. The VLUN disk 235A-N may be configured to report a fixed storage capacity to the operating system of the virtual machine 208A-N rather than the actual, dynamic cache capacity allocated to the virtual machine 208A-N. Accordingly, the cache provisioner 214 may be configured to dynamically provision cache storage to/from the virtual machines 208A-N (through the VLUN disks 235A-N) without adversely affecting the virtual machines 208A-N.

As disclosed above, virtual machines 208A-N may be transferred between hosts 202, without powering down and/or resetting the virtual machine 208A-N. Such transfer operations may be simplified when the virtual machines 208A-N reference shared resources, since the virtual machines 208A-N will be able to access the same resources when transferred. However, virtual machines 208A-N that reference "local" resources (e.g., resources only available on the particular host), may be prevented from being transferred.

In the FIG. 1B embodiment, the CMS 220A-N may be configured to access the cache storage module 213 through the VLUN disk 235A-N that is configured to appear as a "shared device" to the virtualization kernel 210 (and/or a device that does not prevent virtual machines 208A-N from being transferred between hosts 202). The VLUN disk 235A-N may be provided in a "Virtual Machine Disk Format" (VMDK) supported by the host 202 and/or virtualization kernel 210. The I/O filter may further provide for communicating other data, such as configuration, command, and/or control data (e.g., performing a handshake protocol with the cache storage module 213). The virtual disk may be represented as a VLUN disk 235 implemented according to the VMDK format of the host 202 and/or virtualization kernel 210. The virtual disk may be relatively small (e.g., a few megabytes), since the virtual disk is not used for storage, but as a conduit for communication between the virtual machine 208 and the cache storage module 213 in the virtualization kernel 210. Alternatively, or in addition, the VLUN disk 235A-N may be hidden from other applications and/or operating systems of the virtual machine 208A-N and/or may be presented to the virtual machine 208A-N as a read-only storage resource, and as such, the operating system of the virtual machine 208A-N may prevent other applications from attempting to write data thereto.

The virtual machines 208A-N may be configured to emulate shared storage in other ways. For example, in some embodiments, the virtual machines 208A-N may be configured to replicate one or more "shared" VLUN disks across a plurality of hosts 202, such that, to the hosts, the VLUN disks appear to be shared devices. For instance, the VLUN disks may share the same serial number or other identifier. The host 202 and/or the virtualization kernel 210 may, therefore, treat the VLUN disks as shared devices, and allow virtual machines 208A-N to be transferred to/from the host 202. The VDMK approach disclosed above may provide advantages over this approach, however, since a smaller number of "shared" disks need to be created, which may prevent exhaustion of limited storage references (e.g., a virtual machine may be limited to referencing 256 storage devices).

The cache provisioner module 214 may report the actual physical cache storage allocated to the virtual machine 208A via a communication link 124. The communication link 124 may operate separately from I/O data traffic between the VLUN driver 215 and the I/O filter 219A-N. Thus, asynchronous, out-of-band messages may be sent between the VLUN driver 215 and the I/O filter 219A-N. The cache provisioner module 214 may use the communication path 124 to dynamically re-provision and/or reallocate cache resources between the virtual machines 208A-N (e.g., inform the virtual machines 208A-N of changes to cache resource allocations). The I/O driver 218A-N may report the allocation information to the CMS 220A-N, which may use the allocation information to determine the number of cache tags 221A-N available to the virtual machine 208A-N, and so on.

As disclosed above, the cache resources allocated to a virtual machine 208A-N may be represented by cache tags 221A-N. The cache tags 221A-N may comprise, inter alia, mappings between identifiers virtual machine 208A-N (e.g., data I/O addresses) and storage locations within the cache 216 (e.g., physical addresses of cache pages). A cache tag 221 may, therefore, comprise a translation and/or mapping layer between data identifiers and cache resources (e.g., a cache chunk, page, or the like). In some embodiments, cache tags 221A-N are configured to have a linear 1:1 correspondence with physical cache pages, such that each cache tag 221A-N represents a respective page within the cache 216. The cache tags 221A-N may be organized linearly in RAM or other memory within a computing device 102 (as in FIG. 1A) within the virtual machines 208A-N (as in FIG. 1B) and/or virtualization kernel 210 (as in FIG. 1C, disclosed in further detail below). The linear organization may allow the memory address of a cache tag 221A-N to be used to derive an identifier and/or address of a corresponding storage location within the cache 216. Alternatively, or in addition, cache tags 221A-N may be organized into other data structures, such as hashtables, indexes, trees, or the like and/or may comprise separate cache address metadata.

Cache tags 221A-N may comprise cache metadata, which may include, but is not limited to: a next cache tag index, cache state, access metrics, checksum, valid map, a virtual machine identifier (VMID), and so on. The next tag index may comprise a link and/or reference to a next cache tag 221A-N. The cache state may indicate a current state of the cache tag 221A-N. As disclosed in further detail below, the state of a cache tag 221A-N may indicate whether the cache tag 221A-N corresponds to valid data, is dirty, and so on. The access metrics metadata may indicate usage characteristics of the cache tag 221A-N, such as a last access time, access frequency, and so on. A checksum may be used to ensure data integrity; the checksum may comprise a checksum of the cache data that corresponds to the cache tag 221A-N. The size of the checksum of the cache tags 221A-N may vary based on the size of the cache pages and/or the level of integrity desired (e.g., a user can obtain a higher level of integrity by increasing the size of the checksum). The valid unit metadata may identify portions of a cache page that comprise valid cache data. For example, a cache page may comprise a plurality of sectors, and the valid unit may indicate which sectors comprise valid cache data and which correspond to invalid and/or non-cached data.

In some embodiments, cache tags 221A-N may further comprise a VMID, which may be configured to identify the virtual machine 208A-N to which the cache tag 221A-N is allocated. Alternatively, ownership of the cache tag 221A-N may be determined without an explicit VMID. As depicted in FIG. 1B, ownership of cache tags 221 may be determined by the virtual machine 208A-N in which the cache tags 221 are stored. Referring to FIG. 1C, cache tags of one or more virtual machines 208B-N may be maintained outside of the respective virtual machines 208B-N (e.g., within the virtualization kernel 210). In this embodiment, CMS 120 may be configured to associate cache tags 221B-N and/or ranges and/or groups of cache tags 221B-N with particular virtual machines 208B-N by use of, inter alia, a VMID field.

A cache tag 221A-N may be in one of a plurality of different states (as indicated by the cache tag state field of the cache tag 221A-N), which may include, but are not limited to: a free state, an invalid state, a valid state, a read pending state, a write pending state, and a depleted state. A cache tag 221A-N may be initialized to a free state, which indicates that the cache tag 221A-N is not currently in use. The cache tag 221A-N transitions from a free state to a write pending state in response to a cache write and/or cache read update operation (a write to the cache caused by a read miss or the like). The cache tag 221A-N transitions to a valid state in response to completion of the cache write. The cache tag 221 may revert to the write pending state in response to a subsequent write and/or modify operation. The cache tag 221A-N transitions to a read pending state in response to a request to read data of the cache tag, and reverts to the valid state in response to completion of the read. The cache tag 221A-N may transition to the invalid state in response to an attempt to perform a write operation while the cache tag 221A-N is in the read pending or write pending state. The cache tag 221A-N transitions from the invalid state to the free state in response to completing the write or read update. A cache tag 221A-N transitions to the depleted state in response to failure of a read or write operation (e.g., from the read pending or write pending state).

In some embodiments, cache tags 221A-N may further comprise a pinned state indicator. Cache tags 221A-N that are pinned may be protected from being evicted from the cache 216, allocated to another virtual machine 208A-N, or the like. Pinning cache tags 221A-N may also be used to lock a range of cache addresses. In certain situations, a portion of data associated with a read operation is available in the cache 216, but a portion is not available (or not valid), resulting in a partial cache hit. The CMS 220A-N may determine whether to retrieve all of the data from the primary storage system 212 or retrieve a portion from the cache 216 and the remainder from the primary storage system 212, which may involve more than one I/O to the primary storage system 212.

In some embodiments, cache tags 221A-N may further comprise respective log indicators. The log indicators may comprise a mapping and/or translation layer between the cache tags 221A-N and portions of the cache log. As disclosed in further detail herein, cache tags 221A-N may be associated with particular log intervals, sections, and/or periods. The log identifier field may be used to identify data to write back to the primary storage system 212 during log synchronization operations.

In some embodiments, the CMS 220A-N is configured to manage a partial cache miss to minimize the number of I/O requests forwarded on to the primary storage system 212. In addition to managing partial cache miss I/O requests, the CMS 220A-N mitigates the amount of fragmentation of I/Os to primary storage based on I/O characteristics of the I/O requests. Fragmentation of I/Os (also known as I/O splitting) refers to an I/O request that crosses a cache page boundary or is divided between data that resides in the cache and data that resides on the primary storage. The I/O characteristics may include whether the I/O is contiguous, the size of the I/O request, the relationship of the I/O request size to the cache page size, and the like. In effectively managing partial cache hits and fragmentation of I/O requests, the CMS 220A-N may coalesce I/O requests for non-contiguous address ranges and/or generate additional I/O requests to either the cache storage module 213 or the primary storage system 212.

Figure 2:
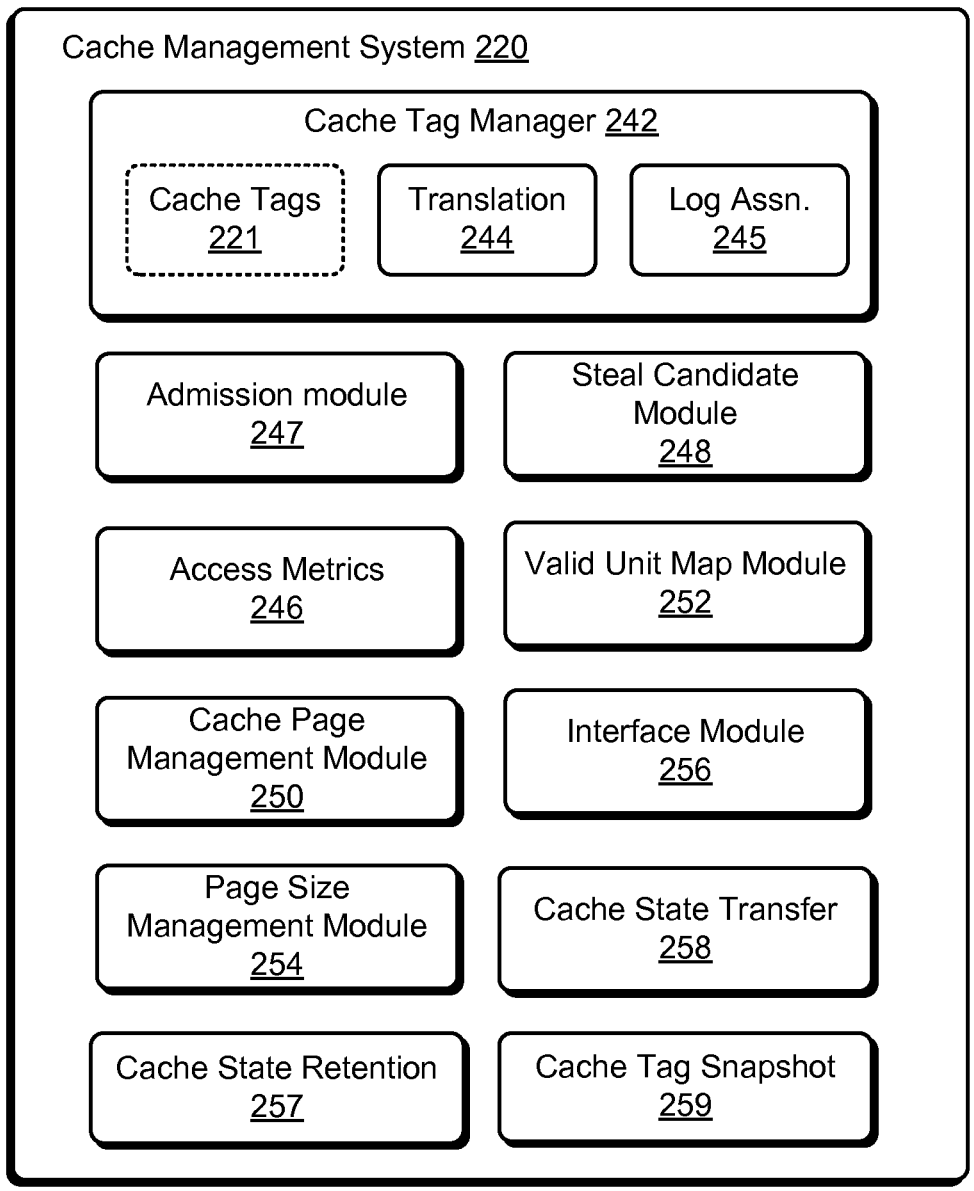
FIG. 2 is a block diagram of one embodiment of a system for persistent cache logging.

FIG. 2 is a block diagram depicting one embodiment of a CMS 220. The CMS 220 may be configured to operate within a bare metal operating environment 103, within a virtual machine 208A-N and/or within a cache virtualization module 233 (e.g., within the virtualization kernel 210 of the host 202, as depicted in FIG. 1C). The CMS 220 may comprise one or more modules, including a cache tag manager 242, log association module 243, cache tag translation module 244, access metrics module 246, a steal candidate module 248, a cache page management module 250, a valid unit map module 252, a page size management module 254, an interface module 256, a cache state retention module 257, a cache state transfer module 258, and a cache tag snapshot module 259.

The cache tag manager 242 may be configured to manage the cache tags 221 allocated to one or more virtual machines 208A-N, which may comprise maintaining associations between virtual machine identifiers (e.g., logical identifiers, address, etc.) and data in the cache 216. The cache tag manager 242 may be configured to dynamically add and/or remove cache tags 221 in response to allocation changes made by the cache provisioner module 214. In some embodiments, the cache tag manager 242 is configured to manage cache tags 221 of a plurality of different virtual machines 208A-N. The different sets of cache tags 221 may be maintained separately (e.g., within separate data structures and/or in different sets of cache tags 221) and/or in a single data structure.

The cache tag translation module 244 may be configured to correlate cache tag identifiers with cache storage locations (e.g., cache addresses, cache pages, etc.). In embodiments in which the CMS 220 is implemented within a bare metal computing environment 103 and/or virtual machine 208A-N (as depicted in FIGS. 1A and 1B), the cache tag identifier may comprise logical addresses and/or identifiers of the data (e.g., the address of the data in the primary storage system 212). In embodiments in which the CMS 220 is implemented within the virtualization kernel 210 (as depicted in FIG. 1C), the cache tag identifier may comprise a block address associated with the data and/or a storage address as identified within the storage stack 211 of the virtualization kernel 210.

The log association module 245 may be configured to map cache tags 221 to corresponding portions of the cache log 320. As disclosed in further detail herein, the log association module 245 may be configured to associate cache tags 221 with respective sections, intervals, and/or portions of the cache log 320 by use of log identifiers (e.g., using a log identifier field within the cache tags 221). Accordingly, the log association module 245 (and log identifiers of the cache tags 221) may comprise a translation layer between the cache tags 221 and respective portions of the cache log 320.

The access metrics module 246 may be configured to determine and/or maintain cache access metrics using, inter alia, one or more clock hand sweep timers, or the like. The steal candidate module 248 may be configured to identify cache data and/or cache tags that are candidates for eviction based on access metrics and/or other cache policy (e.g., least recently used, staleness, sequentiality, etc.), or the like.

The cache page management module 250 may be configured to manage cache resources (e.g., cache page data) and related operations. The valid unit map module 252 may be configured to identify valid data stored in cache 216 and/or a primary storage system 212. The page size management module 254 may be configured to perform various page size analysis and adjustment operations to enhance cache performance, as disclosed herein. The interface module 256 may be configured to provide one or more interfaces to allow other components, devices, and/or systems to interact with the CMS 220, which may include, but is not limited to: modifying the number and/or extent of cache tags 221 allocated to a virtual machine 208A-N, querying and/or setting one or more configuration parameters of the CMS 220, accessing cache tags 221 (e.g., for a snapshot, checkpoint, or other operation), or the like.

The cache state retention module 257 may be configured to retain the portions of the cache state of the CMS 220, which may include the cache tags 221, de-duplication index (disclosed below), and so on, in response to transferring the virtual machine 208A-N to a different host. As disclosed above, the cache tags 221 may represent a working set of the cache of a particular virtual machine 208A-N, which may be developed through the use of one or more cache admission and/or eviction policies (e.g., the access metrics module 246, steal candidate module 248, and so on), in response to the I/O characteristics of the virtual machine 208, and/or the applications running on the virtual machine 208A-N.

The CMS 221 may develop and/or maintain a working set for the cache using inter alia a file system model. The cache 216 may comprise one or more solid-state storage devices, which may provide fast read operations, but relatively slow write and/or erase operations. These slow write operations can result in significant delay when initially developing the working set for the cache. Additionally, the solid-state storage devices comprising the cache 216 may have a limited lifetime (a limited number of write/erase cycles). After reaching the "write lifetime" of a solid-state storage device, portions of the device become unusable. These characteristics may be taken into consideration by the CMS 220 in making cache admission and/or eviction decisions.

The cache state transfer module 258 may be configured to transfer portions of the cache state of the virtual machine 208A-N between hosts 202 and/or to persistent storage (e.g., in a snapshot operation). The cache state transfer module 258 may comprise transferring cache tags 221 maintained in the virtualization kernel, to a remote host and/or non-volatile storage.

The cache tag snapshot module 259 may be configured to maintain one or more "snapshots" of the working set of the cache of a virtual machine 208A-N. As disclosed above, a snapshot refers to a set of cache tags 221 and/or related cache metadata at a particular time. The snapshot module 259 may be configured to store a snapshot of the cache tags 221 on a persistent storage medium and/or load a stored snapshot into the CMS 220.

The cache provisioner module 214 may be configured to maintain mappings between virtual machines and the cache resources allocated to the virtual machines 208A-N. The cache provisioner module 214 may implement mappings that can be dynamically changed to reallocate cache resources between various virtual machines 208A-N. The mappings may be further configured to allow the cache provisioner to represent dynamically allocated cache resources to the virtual machines 208A-N as contiguous ranges of "virtual cache resources," independent of the underlying physical addresses of the cache 216.

Figure 3A:
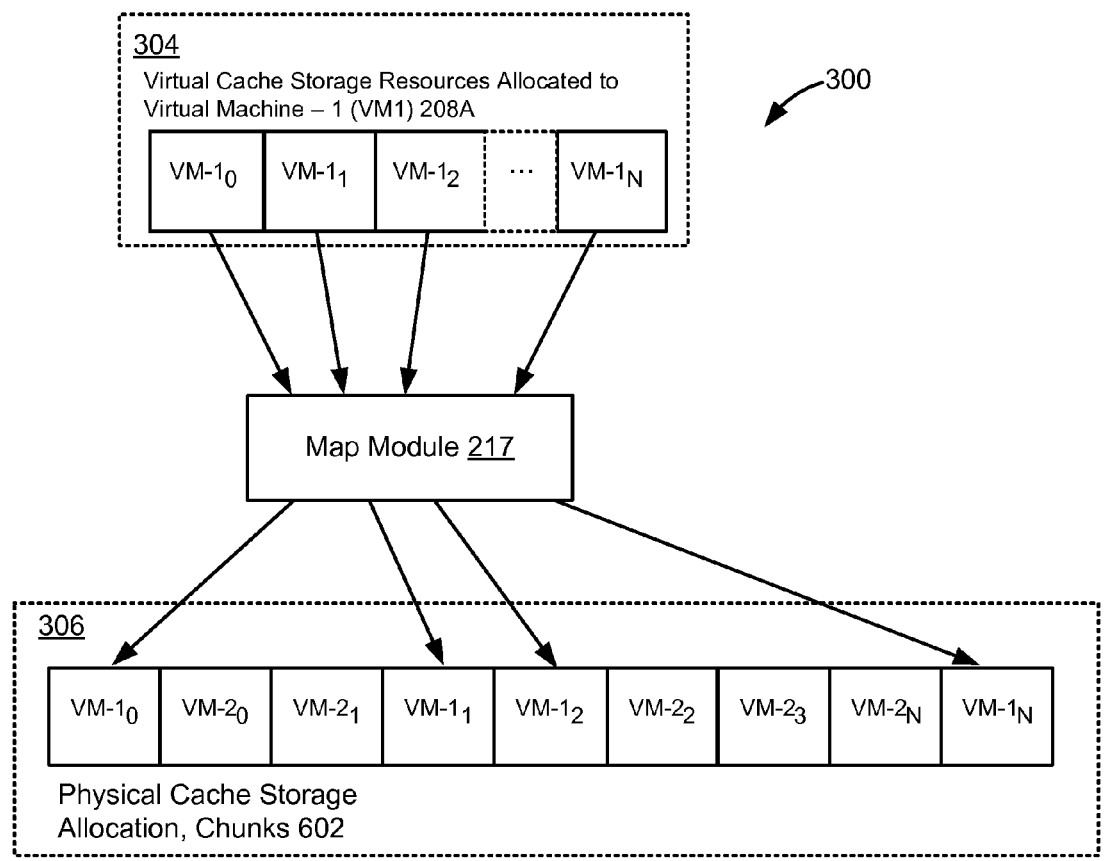
FIG. 3A depicts embodiments of virtual cache resource mappings.

As illustrated in FIGS. 1B and 1C, the cache provisioner module 214 may be configured to allocate cache resources to the virtual machines 208A-N within the cache 216. Resources 224A may be allocated to virtual machine 208A, resources 224B may be allocated to virtual machine 208B, resources 224N may be allocated to virtual machine 208N, and so on. The cache provisioner 214 may be further configured to allocate cache resources 269 for de-duplication caching services, which may comprise allocating cache resources 269 to the de-duplication cache 260. As disclosed in further detail herein, the de-duplication cache 260 may be configured to cache data accessible to two or more of the virtual machines 208A-N. Although the cache resources 224A-N allocated to the virtual machines 208A-N (and the cache resources 269 allocated to the de-duplication cache 260) are depicted as contiguous ranges of physical addresses within the cache 216, the disclosure is not limited in this regard. As illustrated in FIG. 3A below, the cache resources 224A-N and/or 269 may be interleaved, fragmented, and/or discontiguous within the physical address space of the cache 216. The map module 217 may be configured to provide for representing the resources 224A-N and/or 269 as contiguous ranges of virtual cache resources comprising, inter alia, contiguous ranges of virtual cache addresses.

Referring to FIG. 3A, in some embodiments, the cache provisioner module 214 may be configured to allocate "virtual cache storage resources" to the virtual machines 208A-N. As used herein, a "virtual cache resource" refers to an indirect, logical, and/or virtual reference to a physical cache address. Virtual cache resources may be mapped to actual, physical cache storage locations by a map module 217, which may comprise mappings and/or associations between dynamically allocated virtual cache resources (e.g., virtual cache addresses) and physical storage locations within the cache 216. The map module 217 may enable the cache provisioner 214 to allocate contiguous ranges of virtual cache resources to virtual machines 208A-N, despite the fact that the underlying physical storage resources are discontiguous within the physical address space of the cache 216.

In the FIG. 3A embodiment, virtual cache storage 304 is allocated to virtual machine 208A (VM-1). The virtual cache storage 304 may comprise a contiguous range of cache addresses or identifiers. As depicted in FIG. 3A, the virtual cache storage 304 comprises a contiguous range of cache chunks 302, including VM-10, VM-11, VM-12, through VM-1N. The physical cache storage resources actually allocated to VM-1 208A may not be contiguous and/or may be interleaved with cache resources that are allocated to other virtual machines 208B-N. As illustrated in FIG. 3A, the actual physical cache chunks 302 allocated to VM-1 208A comprise a discontiguous set of chunks VM-10, VM-11, VM-12, VM-1N within the physical address space 306 of the cache 216. The virtual address space of the virtual cache storage 304 may be independent of the underlying physical address space 306 of the cache 216. The chunks 302 in the physical address space 306 may be discontiguous and/or interleaved with chunks 302 that are allocated to other virtual machines 208B-N. Although FIG. 3A shows some of the different locations in a physical order, the cache chunks 302 allocated to the VM-1 208A may be located in a random order, in accordance with the availability of physical cache resources (e.g., available chunks 302). Moreover, the chunks 302 allocated to the VM-1 208A may be interleaved and/or fragmented with chunks 302 allocated to other virtual machines.

The map module 217 may be configured to map virtual cache resources (e.g., virtual cache addresses) 304 to physical cache resources in the physical address space 306 of the cache 216. In some embodiments, the map module 217 may comprise an "any-to-any" index of mappings between virtual cache addresses allocated to the virtual machines 208A-N and the physical cache addresses within the cache 216. Accordingly, the virtual cache addresses may be independent of the underlying physical addresses of the cache 216. The translation layer implemented by the map module 217 may allow cache tags 221A-N to operate within a contiguous virtual address space despite the fact that the underlying physical allocations 224A may be non-contiguous within the cache 216. Alternatively, in some embodiments, the mapping module 217 may be omitted, and the CMS 220A-N may be configured to directly manage physical cache addresses within the cache 216.

The map module 217 may be leveraged to secure data in the cache 216. In some embodiments, the cache storage module 213 may restrict access to data in the cache 216 to particular virtual machines 208A-N and/or may prevent read-before-write conditions. The cache provisioner module 214 may be configured to restrict access to physical cache chunks 302 to the virtual machine 208A-N to which the chunk 302 is allocated. For example, the cache chunk labeled VM-10 may only be accessible to the virtual machine 208A based on, inter alia, the mapping between VM-1 208A and the cache chunk VM-10 in the map module 217. Moreover, the indirect addressing of the map module 217 may prevent virtual machines 208A-N from directly referencing and/or addressing physical cache chunks 302 allocated to other virtual machines 208A-N.

As disclosed above, the cache storage module 213 may be configured to control access to data stored within the cache 216 by use of, inter alia, the cache provisioner module 214 and/or map module 217. In some embodiments, the CMS 220A-N and virtual machines 208A-N reference cache data by use of virtual cache addresses rather than physical addresses of the cache 216. Accordingly, the virtual machines 208A-N may be incapable of directly referencing the data of other virtual machines 208A-N. The cache provisioner module 214 may be further configured to allocate different, incompatible virtual cache addresses to different virtual machines 208A-N, such as virtual cache addresses in different, non-contiguous address ranges and/or address spaces. The use of different, incompatible ranges may prevent the virtual machines 208A-N from inadvertently (or intentionally) referencing virtual and/or physical cache resources of other virtual machines 208A-N.

Securing data may comprise preventing read-before-write conditions that may occur during dynamic cache resource provisioning. For example, a first virtual machine 208A may cache sensitive data within a cache chunk 302 that is dynamically reallocated to another virtual machine 208B. The cache storage module 213 may be configured to prevent the virtual machine 208B from reading data from the chunk 302 that were not written by the virtual machine 208B. In some embodiments, the cache provisioner 214 may be configured to erase cache chunks 302 in response to reassigning the chunks 302 to a different virtual machine 208A-N (or removing the association between a virtual machine 208A-N and the cache chunk 302). Erasure may not be efficient, however, due to the characteristics of the cache 216; erasing solid-state storage may take longer than other storage operations (100 to 1000 times longer than read and/or write operations), and may increase the wear on the storage medium. Accordingly, the cache storage module 213 may be configured to prevent read-before-write conditions in other ways. In some embodiments, for example, the cache storage module 213 may be configured to TRIM reallocated chunks 302 (e.g., logically invalidate the data stored on the chunks 302). Cache chunks 302 that are erased and/or invalidated prior to being reallocated may be referred to as "unused chunks." By contrast, a chunk 302 comprising data of another virtual machine 208A-N (and not erased or TRIMed) is referred to as a "used" or "dirty chunk," which may be monitored to prevent read-before-write security hazards.

Figure 3B:
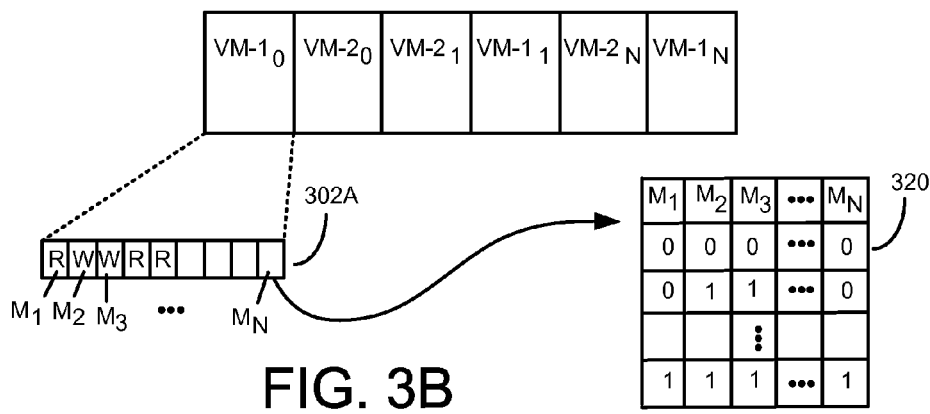
FIG. 3B depicts embodiments of monitoring metadata.

Referring to FIG. 3B, the cache storage module 213 may be configured to maintain monitoring state metadata pertaining to the cache chunks 302. The monitoring state metadata 320 may be persisted for use after a power cycle event. The monitoring state metadata 320 may comprise a bitmask. In some embodiments, each 4 kb sub-portion of a used chunk 302 is monitored to determine whether there has been a corresponding write. Monitoring metadata 320 may be generated in response to reallocating a used or dirty chunk 302 between virtual machines 208A-N. After reallocation, each sub-portion of the chunk 302 may be tested prior to read operations to ensure that the used chunk 302 has been written by the virtual machine 208A-N attempting to perform the read.

In the FIG. 3B embodiment, a chunk 302A is reallocated. The sub-portions of the chunk 302A are represented by references m1 through mN. An indication of a write operation may be reflected by a "1" in the monitoring metadata 320. The cache storage module 213 may be configured to prevent read operations on sub-portions that have not been written (e.g., are not marked with a "1").

Referring back to FIG. 1B, in some embodiments, the CMS 220A-N is configured to operate within the virtual machines 208A-N, and cache tags 221A-N and/or other cache metadata are maintained within the memory space of the respective virtual machines 208A-N. Storing the cache tags 221 (and other cache metadata) within the associated virtual machine 208A-N may allow the virtual machine 208A-N to easily determine whether data is available in the cache 216 without having to access a different system or process (e.g., access the virtualization kernel 210). In such embodiments, the CMS 220 may manage cache operations using locally stored cache tags 221, which may increase the speed and efficiency of I/O operations. Additionally, the virtual machine 208A-N typically has available more detailed information regarding access characteristics than other, external processes and/or systems, and, as such, may be in a better position to make cache management decisions. For example, the virtual machine 208A-N may have access to contextual information pertaining to I/O requests, such as application- and/or file-level knowledge, which may be used to develop an effective working set of cache tags 221. Other systems that are external to the virtual machine 208A-N (e.g., operating within the virtualization kernel 210) may only have access to low-level I/O information. Thus, having the cache tags 221 stored locally in the virtual machine 208A-N may improve cache and/or I/O performance.

FIG. 1C depicts another embodiment of a system 102 for cache logging in a virtualized computing environment. In the FIG. 1C embodiment, the CMS 220B-N of one or more of the virtual machines 208B-N may be implemented within the virtualization kernel 210 (e.g., outside of the corresponding virtual machines 208B-N). The virtual machines 208B-N may be "standard virtual machines" that do not comprise a separate CMS 220A or other cache-specific modules, components, and/or configuration (other than cache functionality provided as part of a standardized virtual machine and/or guest operating system of the virtual machine 208A-N. The system 102 may further comprise one or more virtual machines comprising a respective CMS 220A as in FIG. 1B, such as virtual machine 208A. The cache storage module 213 may be configured to provide caching services to the standard virtual machines 208B-N as well as the virtual machine 208A.

The cache storage module 213 may comprise a cache virtualization module 233 configured to interface with (and/or expose caching services to) virtual machine 208A by use of the cache interface module 223, which may comprise representing cache resources as a VLUN disk 235A within the virtual machine 208A, monitoring I/O requests of the virtual machine 208A by use of the I/O driver 218A and/or filter 219A, and selectively servicing the monitored I/O requests by use of the cache storage module 213 (via the communication link 124). The standard virtual machines 208B-N may access cache services differently. In some embodiments, I/O requests of the virtual machines 208B-N are handled within a storage stack 211. The storage stack 211 may comprise an I/O framework of the host 202 and/or virtualization kernel 210. The storage stack 211 may define a storage architecture in which storage services, such as file system drivers, volume drivers, disk drivers, and the like, are deployed. Storage services may be configured to interoperate by issuing and/or consuming I/O requests within various layers of the I/O stack 211. The cache interface module 223 may comprise an I/O driver 218X and/or filter driver 219X configured to monitor I/O requests of the virtual machines 208B-N in the storage stack 211. Selected I/O requests of the virtual machines 208B-N may be serviced using the cache storage module 213.

The cache virtualization module 233 may comprise a CMS 220X operating within the host 202 and/or virtualization kernel 210. The I/O driver 218X and/or filter driver 219X may be configured to direct I/O requests of the virtual machines 208B-N to the CMS 220X, which may selectively service the I/O requests, as disclosed herein. The CMS 220X may be configured to maintain cache metadata for the virtual machines 208B-N, including, inter alia, cache tags 221B-N. In some embodiments, the CMS 220X maintains the cache tags 221B-N in a single data structure. Alternatively, the cache tags 221B-N may be maintained separately and/or may be managed by separate instances of the CMS 220X.

As disclosed above, the cache provisioner 214 may be configured to provision cache storage resources to the virtual machines 208A-N. The cache provisions 214 may be configured to dynamically re-provision and/or reallocate cache resources in accordance with user preferences, configuration, and/or I/O requirements of the virtual machines 208A-N. The virtual machines 208A-N may have different I/O requirements, which may change over time due to, inter alia, changes in operating conditions, usage characteristics and/or patterns, application behavior, and the like. The cache resources available to the virtual machines 208A-N may vary as well due to, inter alia, virtual machines 208A-N being migrated to and/or from the host 202, virtual machines 208A-N coming on-line, virtual machines 208A-N becoming inactive (e.g., shut down, suspended, etc.), or the like. The cache provisioner 214 may, therefore, be configured to adjust the allocation of cache resources in response to I/O requirements of particular virtual machines 208A-N and/or the I/O characteristics and/or I/O load on the host 202 (due to other virtual machines 208A-N, other processes and/or services running on the host 202, and so on).

Figure 4A:
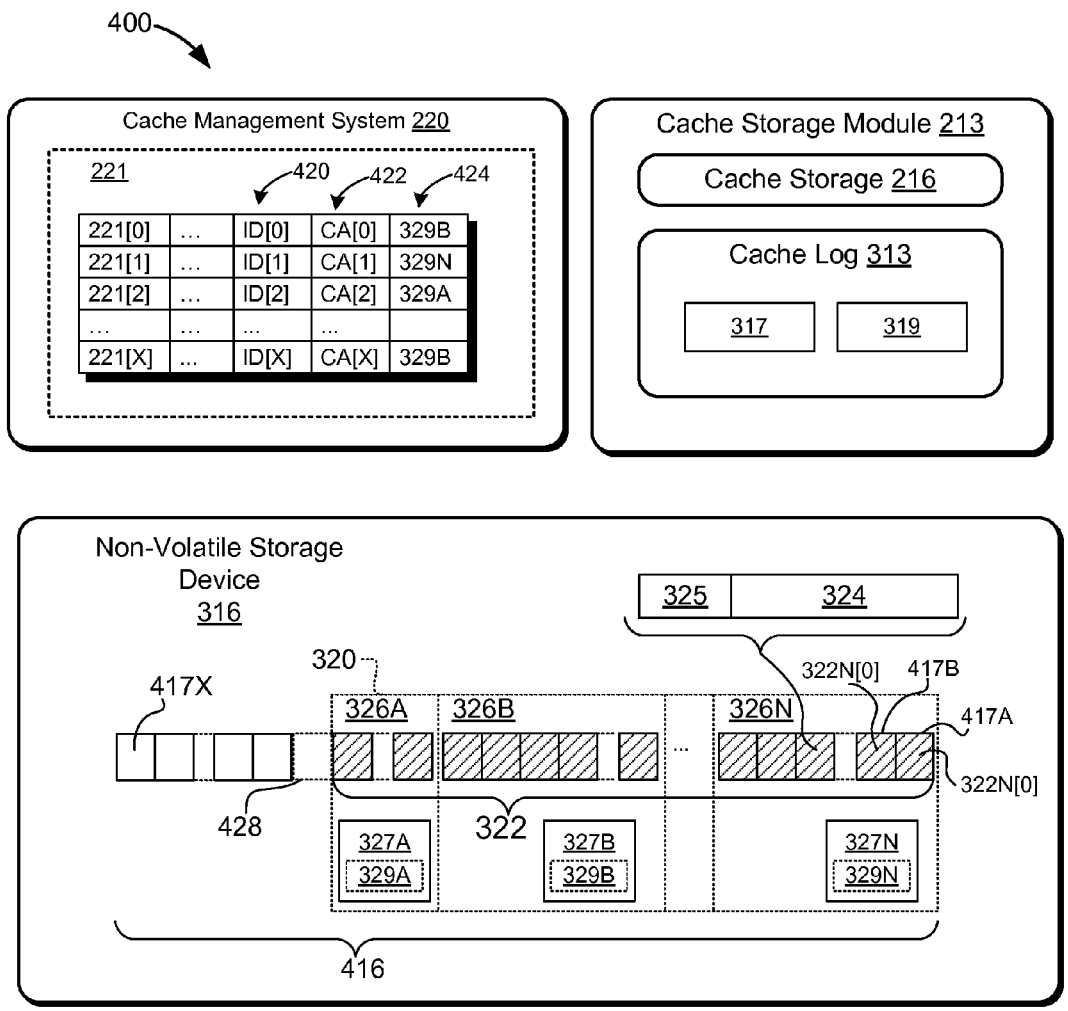
FIG. 4A is a block diagram of one embodiment of a system for persistent cache logging.

As disclosed above, in some embodiments, the CMS 220A-N and/or cache storage module 213 may be configured to operate in a cache logging mode. In a cache logging mode, cache write operations may comprise writing data to the cache 216 and logging the write operation on a persistent cache log 320. The cache storage module 213 may be configured to acknowledge completion of the cache write operation (and corresponding I/O request) in response to storing a record of the write operation within the log 320. FIG. 4A depicts one embodiment of a cache log module 313 configured to store a log 320 of cache storage operations on a non-volatile storage device 316. The cache log module 313 of FIG. 4A may be implemented in conjunction with any of systems 100, 101, and/or 102 disclosed above in conjunction with FIGS. 1A-1C.

The cache log module 313 may be configured to generate the log 320 of cache storage operations on a persistent, non-volatile storage device 316, such as a hard disk, solid-state storage device, or the like. The log 320 may comprise a record of an ordered sequence of storage operations performed on the cache 216. In some embodiments, the cache log module 313 is configured to generate a log 320 comprising a plurality of log entries 322, wherein each log entry 322 corresponds to one or more write operation(s) performed on the cache 216. Each entry 322 in the log 320 may comprise one or more data segments 324 and log metadata entries 325. The data segment 324 may comprise the data that was written into the cache 216 in the corresponding write operation. The log metadata 325 may comprise metadata pertaining to the cache storage operation, which may include, but is not limited to: an identifier of the data (e.g., logical identifier, logical address, block address, etc.), an identifier of the primary storage system 212 associated with the data, an address within the primary storage system 212 associated with the data, an identifier of the storage client 104 associated with the cache write operation, and so on. In some embodiments, the log metadata 325 may further comprise a virtual machine identifier, virtual machine disk identifier, and/or the like configured to identify the virtual machine 208A-N associated with the cache write operation. In some embodiments, and as disclosed in further detail below, the log metadata 325 may be further configured to reference a log segment, period, and/or interval associated with the entry 322. In some embodiments, an entry 322 may comprise data segments 324 and/or log metadata entries 325 corresponding to each of a plurality of cache write operations.

The cache log module 313 may be configured store the log 320 sequentially within a physical address space 416 of the non-volatile storage device 316. As used herein, the "physical address space" refers to a set of addressable storage locations within the non-volatile storage device 316. The physical address space 416 may comprise a series of sector addresses, cylinder-head-sector (CHS) addresses, page addresses, or the like. In the FIG. 4A embodiment, the physical address space of the non-volatile storage device 316 ranges from a first physical storage location 417A (e.g., physical address 0) to a last physical storage location 417X (e.g., physical address X).

The cache log module 313 may be configured to record cache entries 322 at sequential storage locations within the physical address space 416 of the non-volatile storage device 316. The sequential order of cache entries 322 within the physical address space 416 may correspond to the temporal order in which the corresponding cache storage operations represented by the entries 322 were received and/or performed. The sequential order of the cache entries 322 within the log 320 may, therefore, be independent of data identifier(s) and/or addressing information of the corresponding cache write operations. As such, logging cache storage operations sequentially within the log 320 may comprise converting "random" write operations (write operations pertaining to random, arbitrary physical addresses of the primary storage system 212) into a series of sequential write operations.

In some embodiments, the cache log module 313 is configured to sequentially append log entries 322 to the log 320 at a current append point 428 within the physical address space 416. After appending an entry 322 to the log 320, the append point 428 may be incremented to the next sequential physical address, and so on. The cache log module 313 may manage the physical address space 416 as a cycle; after appending an entry 322 at the last physical storage location X 417X, the append point 428 may reset back to the first physical storage location 0 417A. In the FIG. 4A embodiment comprising physical addresses 417A through 417X, for example, a first cache entry 322N[0] corresponding to a first cache storage operation may be written to physical address 0 417A, a second cache entry 322N[1] corresponding to the next cache storage operation may be written to physical address 1 417B, and so on. After writing to the last physical address X 417X, the cache log module 313 may resume writing cache log entries 322 back at physical storage address 0 417A.

The non-volatile storage device 316 may be capable of much higher write speeds for sequential operations as compared to write operations that are randomly distributed within the physical address space of the device 316. Therefore, storing log entries 322 sequentially within the physical address space 416 may allow the cache log 313 to perform write operations much more efficiently than random write operations performed in, inter alia, write-through and/or write-back cache modes. In some embodiments, for example, the non-volatile storage device 316 may comprise a hard disk capable of sequential writes at 200 MB/second or more. In other embodiments, the cache log module 313 may be configured to store log information on a solid-state storage device capable of sequential writes at 500 MB/second or more. Random write speeds for these types of storage devices may be significantly lower.

The cache log module 313 may comprise a synchronization module 317 configured to synchronize the cache to the primary storage system 212. As used herein, synchronizing refers to updating the primary storage system 212 in accordance with the cache storage operations represented in the log 320 (e.g., transferring "dirty" cache data from the cache 216 to the primary storage system 212 and/or other backing store). The synchronization module 317 may be configured to synchronize portions of the log 302 to the primary storage system 212, which may comprise "applying" or "committing" portions of the log 320 by, inter alia, implementing the cache write operations represented by the cache entries 322 on the primary storage system 212.

The sequential format of the log 320 disclosed above may be highly efficient for write operations, but may exhibit poor read performance due to, inter alia, overhead involved in identifying the storage location of particular cache entries 322 in the log 320, and so on. Therefore, in some embodiments, committing the log 320 may comprise accessing cache data from the cache 216 rather than the cache log 320. In some embodiments, committing the log 320 may comprise: a) accessing, within the cache 216, data corresponding to cache write operations recorded in the log 320, and b) writing the data to the primary storage system 212 (and/or other backing stores). As disclosed above, cache tags 221 may be correlated to the log 320 by use of respective cache tag indicators 424. In some embodiments, the cache tag indicators 424 may indicate whether the corresponding cache data is "dirty." As used herein, "dirty" data refers to data that has been written and/or modified within the cache, but has not been written to the corresponding backing store (e.g., primary storage system 212); "clean" cache data refers to cache data that has been written to the backing store. Accordingly, accessing data corresponding to the cache write operations recorded in the log 320 may comprise accessing data associated with dirty cache tags 221 and writing the accessed data to the primary storage system 212. Committing the log 320 may further comprise updating the cache tags 221 to indicate that the data has been committed to the primary storage system 212 (e.g., set the cache tag indicator(s) 424 to clean) and/or updating the log 320 to indicate that the entries 322 therein have been committed.

As illustrated in FIG. 4A, in some embodiments, the cache log module 313 may be configured to partition and/or divide the log 320 into two or more log segments 326A-N. As disclosed herein, partitioning the log 320 may enable the cache log module 313 to implement finely-grained synchronization and/or data recovery operations. Each of the log segments 326A-N may comprise a respective set of one or more log entries 322. The log segments 326A-N may be configured to represent different, respective log intervals, periods, or the like within the log 320. In the FIG. 4A embodiment, the log segments 326A-N may be ordered from the current log segment 326A (a most recent log segment 326A) to the oldest log segment 326N. The cache log module 313 may be configured to append entries 322 at the head of the current log segment 326A (at append point 428), as disclosed above. In some embodiments, the log segments 326A-N are a pre-determined fixed size. Alternatively, the log segments 326A-N may vary in length. In some embodiments, for example, the log segments 326A-N may correspond to respective time intervals, and may be sized in accordance with the cache storage operations performed during the respective time intervals.

The cache log module 313 may be configured to associate each log segment 326A-N with respective log segment metadata 327A-N. The log segment metadata 327A-N may include a segment identifier 329A-N, which may determine an order of the log segments 326A-N. The segment identifiers 329A-N may comprise any suitable identifying information including, but not limited to: a time stamp, a sequence number, a logical clock value, a lamport clock value, a beacon value, or the like. The log segment metadata 327A-N may further include, but is not limited to: a synchronization indicator configured to indicate whether the log segment 326A-N has been committed, a discardability indicator configured to indicate whether the log segment 326A-N needs to be retained on the non-volatile storage device 316, and so on. As disclosed in further detail herein, after committing a log segment 326A-N, the log segment 326A-N may be marked as committed and/or discardable, which may allow the cache log module 313 to reuse the storage resource occupied by the log segment 326A-N on the non-volatile storage device 316. In some embodiments, the log segment metadata 327A-N is stored on the non-volatile storage device 316 (as a header to a log segment 326A-N).

As disclosed above, an operation to write data into the cache may comprise: a) writing the data to the cache 216, and b) appending a log entry 322 corresponding to the cache write operation to the log 320. The cache write operation (and corresponding I/O request) may be acknowledged as complete in response appending the log entry 322. As disclosed above, the data written into the cache 216 may be associated with cache metadata, such as respective cache tags 221. The cache tags 221 may include, inter alia, an identifier 420 of the data, such as a logical identifier, a logical address, a data identifier, a storage I/O address, the address of the data on a backing store (e.g., primary storage system 212), a storage location 422 of the data within the cache 216, and the like. The cache tags 221 may further comprise log indicators 424 configured to map the cache tags 221 to respective log segments 326A-N. The log indicator 424 may identify the log segment 326A-N comprising the entry 322 that corresponds to the cache write operation in which the data of the cache tag 221 was written to the cache 216. The log indicator 424 of a cache tag 221 may be updated when data of the cache tag is written to cache 216. The CMS 220 may be configured to determine the current segment identifier 329A-N, and to set the log indicator field 424 accordingly. Alternatively, or in addition, the cache log module 313 may be configured to publish the current segment identifier 329A-N to the CMS 220, which may apply the published segment identifier 329A-N in response to writing and/or updating data of the cache tags 221. As illustrated in FIG. 4A, the cache tag 221[0] indicates that the log entry 322 corresponding to the cache write operation of data ID[0] 420 to cache location 422 CA[0] is in log segment 326B, cache tag 221[1] is mapped to log segment 326N, cache tag 221[2] is mapped to log segment 326A, and so on (cache tag 221[X] is mapped to log segment 326B).

As disclosed above in conjunction with FIGS. 1B and 1C, the cache log module 313 may be configured to log cache operations for a plurality of virtual machines 208A-N, which may request cache write operations asynchronously and/or at different, variable rates. As such, the log indicator 329A-N published and/or provided to a first virtual machine 208A may change before the corresponding write operation is performed (e.g., due to one or more intervening cache write operations performed by the other virtual machines 208B-N); in response, the cache log module 313 may be configured to indicate the new log indicator 329A-N to the CMS 220A of the virtual machine 208A, which may update the corresponding cache tag 221A accordingly.

The cache log module 313 may be configured to commit portions of the log 320 to the primary storage system 212 (and/or other backing stores). Committing a portion of the log 320 may comprise committing one or more log segments 326A-N and, as disclosed above, committing a log segment may comprise updating the primary storage system 212 in accordance with the write operations recorded within entries 322 of the one or more log segments 326A-N.

Figure 4B:
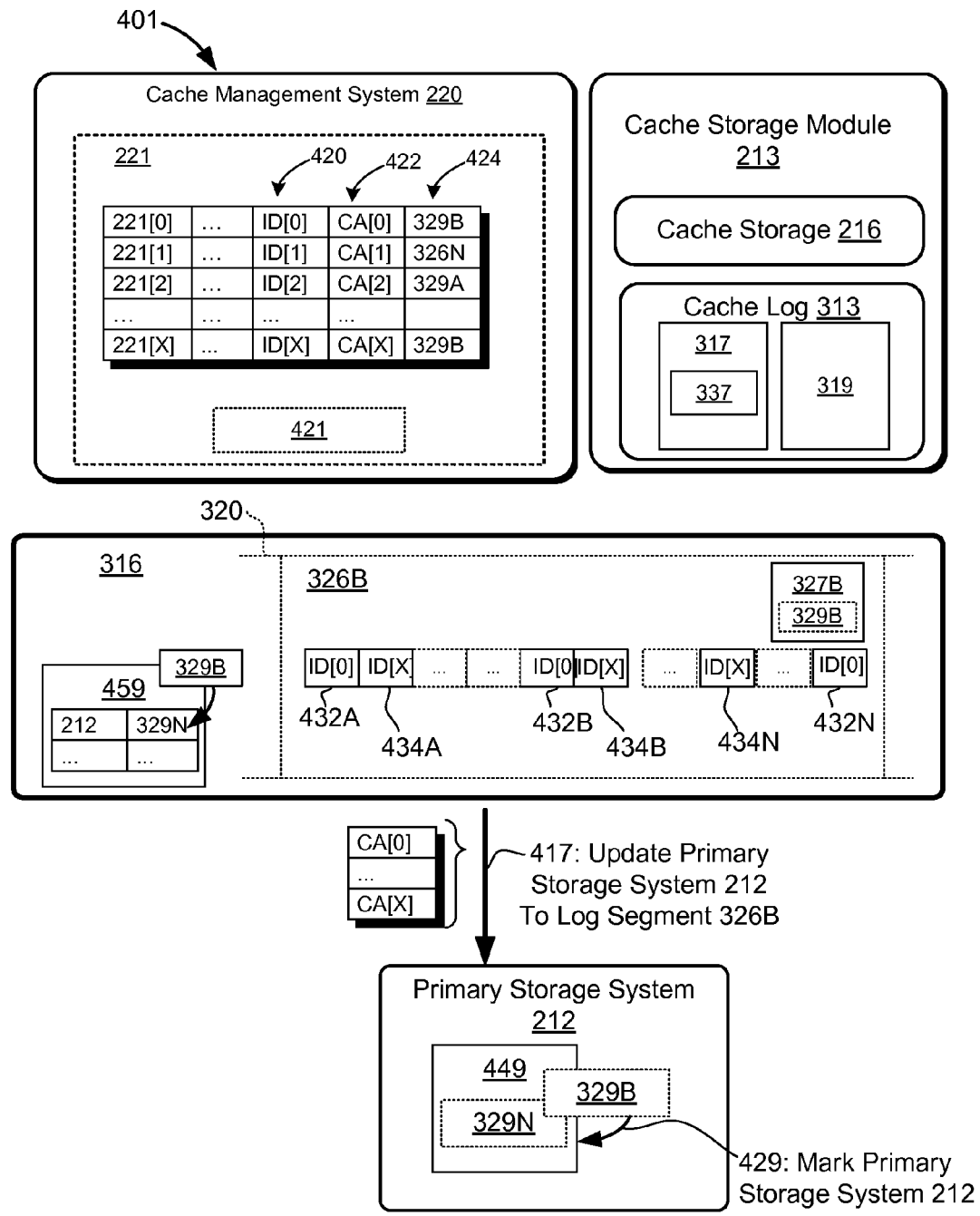
FIG. 4B is a block diagram of one embodiment of a system for persistent cache logging configured to commit a portion of a cache log.

FIG. 4B depicts another embodiment of a system 401 for cache logging. The FIG. 4B embodiment illustrates a synchronization operation in additional detail. The synchronization module 317 may be configured to commit portions of the log 320 (e.g., log segments 326A-N) in response to particular operating conditions, states, and/or triggering events, which may include, but are not limited to: filling a threshold amount of the capacity of the cache log 320 and/or non-volatile storage device 316, filling a log segment 326A-N, incrementing the current log segment, a synchronization request (issued by a storage client 104, virtual machined 208A-N, cache storage module 213, CMS 220, user, application, or other entity), a time threshold, resource availability (e.g., low load conditions at the computing device 102, host 202, virtualization kernel 210, primary storage system 212, network 105, and/or the like), or the like. In some embodiments, the synchronization module 317 comprises a synchronization policy module 337 configured to monitor the cache storage module 213 (and/or other modules and/or devices disclosed herein) and to initiate synchronization operations based on one or more of the conditions and/or triggering events disclosed herein.

In the FIG. 4B embodiment, the cache log module 313 is configured to commit log segment 326B. The synchronization operation depicted in FIG. 4B may be initiated by the synchronization policy module 337 in response to filling the log segment 326B, rolling over to log segment 326A, or the like. In FIG. 4B, other portions of the log 320 are omitted to avoid obscuring the details of the depicted embodiment.

As disclosed above, in some embodiments, storage clients 104 may repeatedly write data to the same addresses and/or identifiers. For example, a storage client 104 may repeatedly update certain portions of a file and/or database table. In the FIG. 4B embodiment, the log segment 326B includes entries 432A-N corresponding to cache write operations associated with the same data identifier ID[0]. The log segment 326B may further comprise multiple cache write operations associated with data identifier ID[X]. Other cache write operations pertaining to other data identifiers are omitted from FIG. 4B to avoid obscuring the details of the disclosed embodiment.

The synchronization module 317 may be configured to combine multiple, redundant write operations to the same data identifier into a single write to the primary storage 412. In some embodiments, the synchronization operation comprises accessing data associated with the log indicator 329B of the log segment to be committed from the cache 216. In the FIG. 4B embodiment, this may comprise issuing one or more requests for data associated with the log identifier 329B. The requests may be issued to the CMS 220 operating within the bare metal operating environment 103 (as depicted in FIG. 1A), to a plurality of CMS 220A-N operating within respective virtual machines 208A-N (as depicted in FIGS. 1B and 1C), and/or to one or more CMS 220X operating within the virtualization kernel 210 as depicted in FIG. 1C. For clarity, the description of FIG. 4B proceeds with reference to a single CMS 220.

The CMS 220 may identify data associated with the log indicator 329A in reference to log indicators 424 of the cache tags 221 (e.g., by use of the of the log association module 245). In some embodiments, the cache tags 221 may be indexed by their respective log indicators 424. In some embodiments, the CMS 220 may comprise a separate log indicator index data structure 421 configured to provide efficient mappings between log indicators and corresponding cache tags 221. The log indicator index 421 may comprise a hash table, tree, or similar data structure. In some embodiments, the log indicator index 421 may comprise indirect references to the cache tags 221 (e.g., links, pointers, or the like) such that the contiguous memory layout of the cache tags 221 can be preserved.

As disclosed above, in the FIG. 4B embodiment, the synchronization module 317 is configured to commit log segment 326B, which may comprise requesting data associated with the log sequence indicator 329B. In response to the request, the CMS 220 may identify the cache tags 221 associated with the log indicator 329B, as disclosed above. The cache tags 221 corresponding to log segment 326B include cache tag 221[0] and cache tag 221[X]. As illustrated in FIG. 4B, the cache tag 221[0] corresponds to the most up-to-date version of data ID[0] and the cache tag 221 corresponds to the most up-to-date version of data ID[X]] within the log segment 328B. Previous versions of data ID[0] corresponding to entries 432B-N and data ID[X] corresponding to entries 434B-N are ignored. Accordingly, the mapping layer between the cache tags 221 and the log 320 enables the synchronization module 317 to efficiently aggregate the sets of multiple write operations 432A-N and 434A-N into a single write per cache tag 221[0] and 221 [X].

The CMS 220 may be configured to read the corresponding data from the cache 216 (as if performing a read operation), and to provide the data to the synchronization module 317 (e.g., read the data at CA[0] and CA[X] respectively). Alternatively, the CMS 220 may be configured to provide the synchronization module 317 with the cache address of the identified cache tags 221 and the synchronization module 317 may perform the read operations(s) directly on the cache 216. The CMS 220 may be further configured to provide the synchronization module 317 with data identifier(s) of the identified cache tags 221, which may include a disk identifier and/or disk address of the data on a backing store, such as the primary storage system 212. The synchronization module 317 may use the data accessed from CA[0] and CA[X] (and the corresponding disk identifier and addressing information) obtained from the corresponding cache tags 221[0] and 221[X] to update 417 the primary storage 212. The update 417 may comprise issuing one or more storage requests to the primary storage system 212 (or other backing store) to write the data CA[0] and CA[X] at the appropriate address(es). As illustrated in FIG. 4B, the update 417 operation may comprise single, respective write operations for the sets of multiple cache write entries associated with data ID[0] and data ID[X] in log segment 326B.

The synchronization module 317 may be further configured to mark the primary storage system 212 (and/or other backing stores) with persistent metadata 449. The persistent metadata 449 may be stored at one or more pre-determined storage locations within the primary storage system 212 (and/or other backing stores). The persistent metadata 449 may comprise a log indicator 329B that corresponds to the most recent cache log synchronization operation performed thereon. As illustrated in FIG. 4B, before the update 417, the persistent metadata 449 may comprise a log indicator 329N, which may indicate that the persistent storage system 212 is up-to-date as of the log segment 326N, but that the more recent operations of log segment 326B have not yet been committed. Upon completing the update 417, the synchronization module 317 may be configured to mark 429 the primary storage system 212 (and/or other backing stores) with the log indicator 329B, to indicate, inter alia, that the primary storage system 212 is up-to-date with respect to the cache write operations in the log segment 326B. Alternatively, or in addition, the synchronization module 317 may be configured to maintain synchronization metadata 459 within another non-volatile storage device, such as the non-volatile storage device 316. The synchronization metadata 459 may comprise a table, or other data structure, indicating the synchronization status of one or more backing stores (e.g., the primary storage system 212). Upon completing the update 417, the synchronization module 317 may update the synchronization metadata 459 to indicate that the primary storage system 212 (and/or other backing stores) are up-to-date with respect to the cache write operations in the log segment 326B.

The synchronization module 317 may be further configured to reclaim the log segment 326B after committing the log segment 326B to the primary storage system 212 (and/or other backing stores). Reclaiming the log segment 326B may comprise indicating that the contents of the log segment 326B no longer need to be retained within the log 320 and/or on the non-volatile storage device 316. In some embodiments, reclaiming the log segment 326B comprises updating metadata 327B of the log segment 326B to indicate that the log segment can be erased, overwritten, deallocated, or the like. Alternatively, or in addition, reclaiming the log segment 326B may comprise erasing the contents of the log segment 326B, deallocating the log segment 326B, and/or allowing the log segment 326B to be overwritten. In embodiments comprising a solid-state storage device 316 to store the log 320, reclaiming the log segment 326B may comprise issuing one or more TRIM hints, messages, and/or commands indicating that the log segment 326B no longer needs to be retained.

In some embodiments, the cache log 313 may be configured to preserve cache data until the data is committed to the primary storage system. For example, before the contents of the log segment 328B are committed the cache storage module 213 may receive a request to write data ID[0] (in a next log segment 326A). Performing the requested operation may comprise overwriting the data ID[0] in the cache 216 (and the cache tag 221[0]), such that the data ID[0] of entry 432A would differ from the data read from the cache 216. In some embodiments, the synchronization module 317 is configured to prevent such hazards by committing log segments 326A-N atomically, as the log segments 326A-N increment; the cache storage module 213 may be configured to block and/or stall incoming cache write requests while the synchronization module 317 commits the log segment 326B. In addition, the synchronization policy module 337 may be configured to schedule a synchronization operation when the current log segment 326B is filled and/or is to be incremented to a next log segment 326A.

In other embodiments, the cache log module 313 may be configured to allow the log 320 to include multiple, uncommitted log segments 326A-N, and may perform synchronization operations while other cache write operations continue. The cache storage module 213 may avoid hazard conditions by marking uncommitted cache tags 221 and the corresponding cache data as copy-on-write. As used herein, an "uncommitted" cache tag 221 refers to a cache tag 221 corresponding to data that has not been committed to the primary storage system 221. Cache operations that would overwrite a copy-on-write cache tag 221 may comprise allocating a new cache tag 221, and performing the write operation, while maintaining the original, uncommitted cache tag 221 and corresponding data in the cache 216. After the cache tag 221 is committed, it may be removed (along with the corresponding data in the cache 216).

The cache log module 313 may further comprise a recovery module 319. The recovery module 319 may be configured to perform one or more recovery operations in response to detecting a failure condition. As used herein, a failure condition may include, but is not limited to: loss of data in the cache 216, loss of cache metadata by the CMS 220 (e.g., cache tags 221) and/or virtual machines 208A-N, data corruption (e.g., uncorrectable errors), and the like. A failure condition may occur for any number of reasons including, but not limited to: a hardware fault, a software fault, power interruption, storage media failure, storage controller failure, media wear, poor operating conditions, an invalid shutdown, an invalid reboot, or the like. The recovery module 319 may comprise a recovery policy module 339 configured to detect such failure conditions, and in response, to initiate recovery operations by the recovery module 317. Accordingly, the recovery policy module 339 may be configured to monitor operating conditions of the cache storage module 213, cache 216, computing device 102, host 202, virtual machines 208A-N, virtualization kernel 210, and the like.

The recovery module 319 may be configured to synchronize the primary storage system 212 to the contents of the log 320, which may comprise: a) determining a synchronization state of the primary storage system 212 and/or identifying the set of log entries 322 that have not been committed to the primary storage system 322, and b) applying the log 320 to the primary storage system 212 in accordance with the determined synchronization state (e.g., committing the write operations corresponding to the identified entries 322). Determining the synchronization state may comprise determining the last log segment 326A-N that was committed to the primary storage system 212 (if any). The last log segment 326A-N committed to the primary storage system 212 may be determined by reference to, inter alia, the synchronization metadata 459 stored on the non-volatile storage device 316 (or other persistent storage) and/or the persistent metadata 449 stored on the primary storage system 212 itself. The recovery module 319 may be configured to commit the contents of the log in accordance with the determined synchronization state (e.g., starting from the last log segment 326A-N known to have been committed to the primary storage system 212 and continuing through the end of the log 320). The recovery operation may further comprise clearing the log 320 (removing and/or invalidating the contents of the log 320), and resuming cache logging operations, as disclosed herein.

Figure 4C:
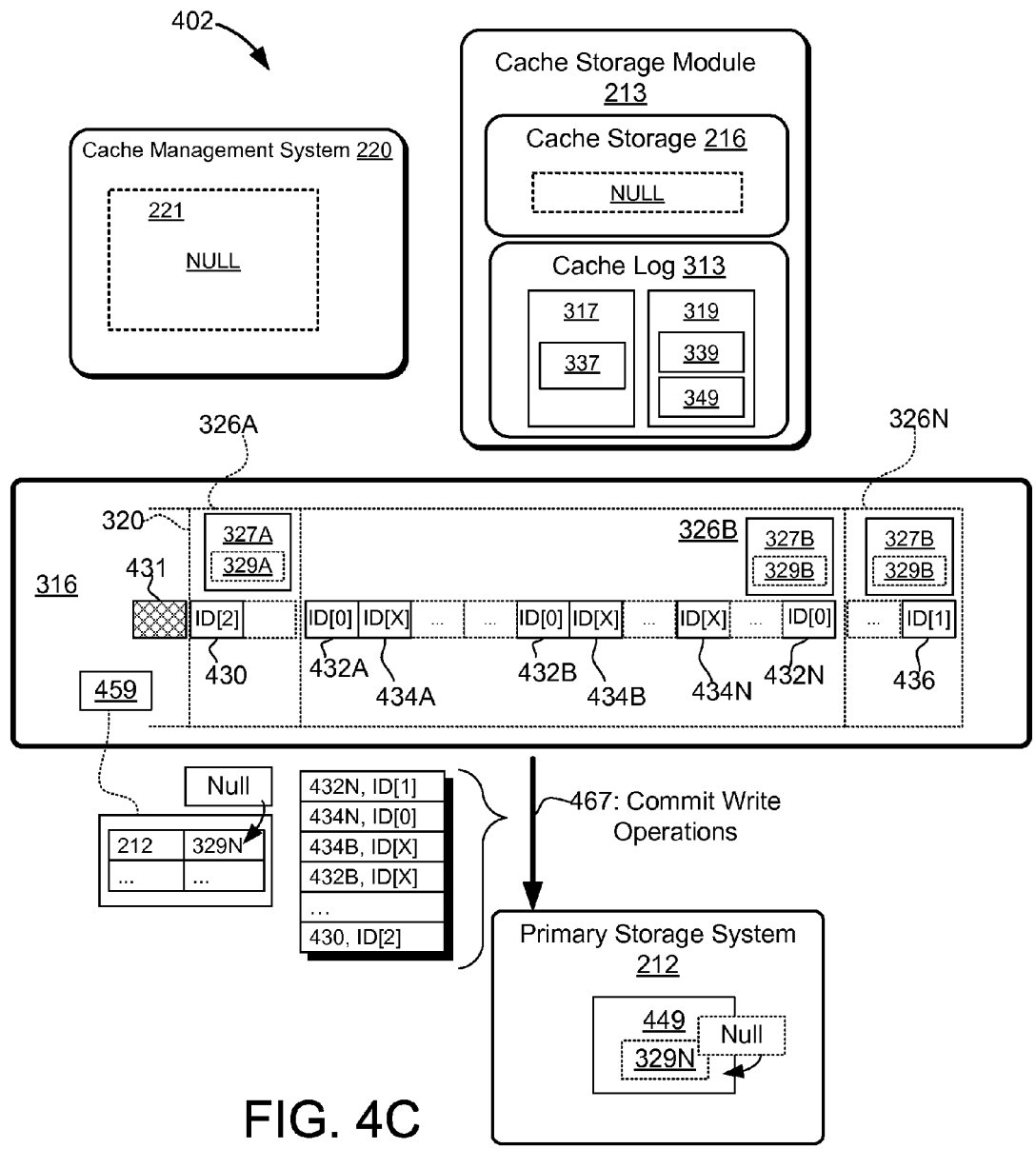
FIG. 4C is a block diagram of one embodiment of a system for persistent cache logging configured to recover cache data from a cache log.

FIG. 4C depicts another embodiment of a system 402 for cache persistence. A failure condition may occur, resulting in loss of the contents of the cache 216 and/or cache metadata (e.g., cache tags 221). The failure condition may occur after appending entry 430 to the log 320. The cache policy module may detect the failure condition and may initiate a recovery operation by the recovery module 319, as disclosed above.

The recovery module 319 may be configured to determine the synchronization state of the primary storage system 212 using, inter alia, persistent metadata 449 stored on the primary storage system 212 and/or synchronization metadata 459. As illustrated in FIG. 4C, the primary storage system 212 may be up-to-date as of log segment 326N (per the log indication 329N in the persistent metadata 449 and synchronization metadata 459).

The recovery module 319 may, therefore, begin committing the contents of the log 320 immediately following the end of the log segment 326N. In the FIG. 4C embodiment, the starting point for the recovery operation is the log entry 432N. In some embodiments, the recovery module 319 is configured to traverse the log 320 from the starting point 432N to the end of the log 320 (log entry 430). The end of the log 320 may be identified using the log indicators 329A-N. As disclosed above, and referring to FIG. 4A, the cache log module 313 may be configured to store log entries 322 sequentially within the physical address space 416 of the non-volatile storage device 316, which may comprise wrapping from an end of the physical address space 417X to the beginning of the physical address space 417A. The recovery module 319 may be configured to traverse the sequence of log entries in the physical address space 416, including wrapping between ends 417X and 417A. Referring back to FIG. 4C, the recovery module 319 may identify the end of the log 320 in response to accessing an invalid log segment comprising a non-incrementing log indicator and/or in response to accessing an entry 322 that comprises invalid metadata 325. The last entry 430 in the log 320 may reference log segment 326A. The following entry 431 (if any) may comprise invalid data, may reference an invalid log segment, and/or comprise an invalid log indicator. The recovery module 319 may, therefore, identify the end of the log 320 in response to accessing the entry 431 and/or failing to find valid entries 322 beyond entry 430.

In some embodiments, the recovery module 319 is configured to commit each log entry 322 accessed while traversing from the last committed log segment (segment 326N or log entry 432N) to the end of the log 320 (entry 430). Committing a log entry 322 may comprise reading the log metadata 325 to determine, inter alia, the backing store associated with the log entry 322 (e.g., primary storage system 212), an address and/or identifier of the data, and writing the data segment 324 of the log entry 322 to the identified backing store and/or address. Committing the log entries from 432N to 430 may comprise replaying the sequence of cache write operations recorded in the log 320. In the FIG. 4C embodiment, replaying the sequence of cache write operations from the end of log segment 326N may include, inter alia, writing: the data segment 324 ID[1] of entry 432N; the data segment 324 ID[0] of entry 434N; the data segment 324 ID[X] of entry 434B; the data segment 324 ID[0] of entry 432B, the data segment ID[X] of entry 434N, the data segment ID[0] of entry 432A, and the data segment ID[2] of entry 430. After committing the write operations 467, the recovery module 319 may clear the log 320 and resume normal operations. Clearing the log 320 may comprise invalidating, reclaiming, and/or erasing the log 320, as disclosed above.

As illustrated above, sequentially committing the write operations in the log 320 may comprise performing multiple, redundant write operations 467; data segments for ID[0] and ID[X] may be written three times each, when only single write operations for each is required to update the primary storage system 212 with the current version of data ID[0] and ID[X] (e.g., only entries 432A and 434A have to be applied). In some embodiments, the recovery module 319 may be configured to buffer write operations in a write queue 349 while the recovery module 319 is configured to defer the write operations until the traversal is complete. During the traversal, the recovery module 319 may access the entries 322 and queue corresponding write operations in a write buffer 349. The recovery module may remove queued write operations that would be made redundant and/or obviated by entries 322 encountered later in the log 320 (e.g., later entries that pertain to the same data identifier and/or address). After the traversal is complete, the recovery module 320 may implement the remaining write operations in the write buffer 349, such that the write operations 467 to the primary storage system 212 do not include multiple, redundant writes.

Figure 4D:
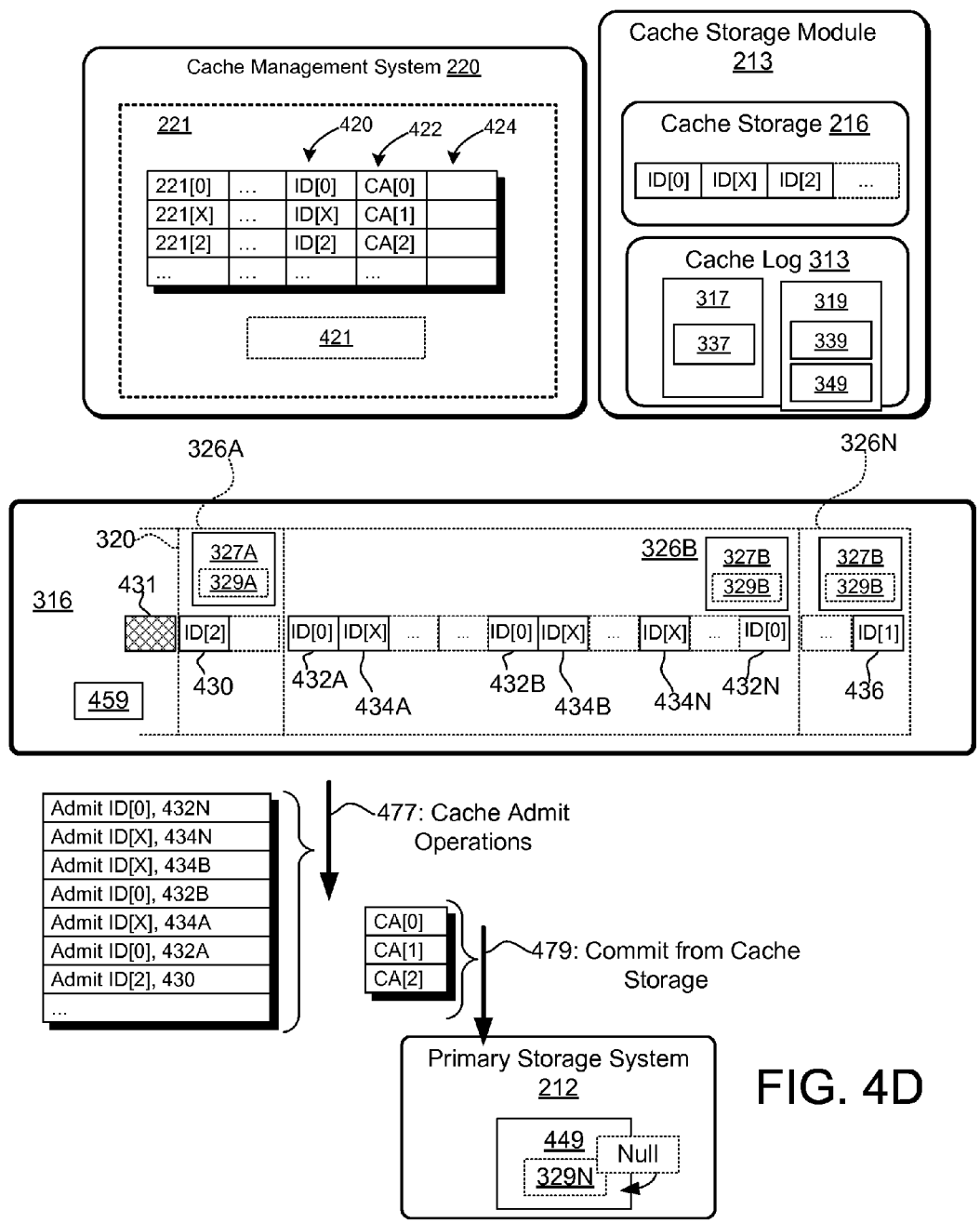
FIG. 4D is a block diagram of another embodiment of a system for persistent cache logging configured to recover cache data from a cache log.

As indicated in FIG. 4C, after the failure condition, the cache metadata (cache tags 221) and cache 216 may be lost (e.g., null or empty). The contents of the log 320 may represent at least a portion of the working set of the cache (the portions pertaining to recent cache write operations). Referring to FIG. 4D, in some embodiments, the recovery module 339 may be configured to warm the cache while performing recovery operations, which may comprise: a) traversing the log 320 as disclosed herein, b) admitting entries 322 encountered during the traversal into the cache, and c) committing the contents of the cache to the primary storage system 216 (or other backing store). Admitting an entry 322 into the cache may comprise configuring the CMS to allocate a cache tag 221 for the write operation of the entry 322, populating the allocated cache tag 221 with log metadata 325 of the entry 322, such as the data identifier, backing store, storage address, and so on, and storing the data segment 324 of the entry in the cache 216. In some embodiments, the recovery module 319 may be configured to admit 477 entries 322 into the cache as the entries 322 are traversed. As illustrated in FIG. 4D, performing admission operations while traversing the log 320 may result in multiple, redundant cache write operations. The overhead of these redundant operations, however, may be significantly less than the overhead of the redundant write operations to the primary storage system 212 as in FIG. 4C. In some embodiments, the recovery module 319 may be configured to defer the cache admission operations 477 until the traversal is complete. While traversing the log 320, the recovery module 319 may queue the cache admission operations in the write buffer 349, which, as disclosed above, may comprise removing cache admission operations made redundant by entries 322 later in the log 320. After the traversal is complete, the recovery module 319 may perform the remaining cache admission operations in the write buffer 349. As illustrated in FIG. 4D, warming the cache may comprise initializing the CMS 220 and cache 216 with, at least a portion, of the cache state lost in the failure condition.

After performing the cache admission operations 477, the recovery module may commit the contents of the cache 216 to the primary storage system 212 (and/or other backing stores). Committing the contents of the cache 216 may comprise requesting, from the CMS 220, cache data of all of the cache tags 221 (as opposed to only the tags associated with one or more log segments 326A-N). Since data is committed 479 using the CMS 220 (and cache tags 221), the commit operations 479 may not include redundant write operations.

After committing the contents of the cache 216 to the primary storage system 212, the recovery module may be configured to clear the log 320, clear the persistent metadata 449 of the primary storage system (e.g., clear the log indicator), and/or clear the synchronization metadata 459, as disclosed above. The CMS 220 and cache storage module 213 may then resume normal logged cache operations, as disclosed herein.

Figure 5:
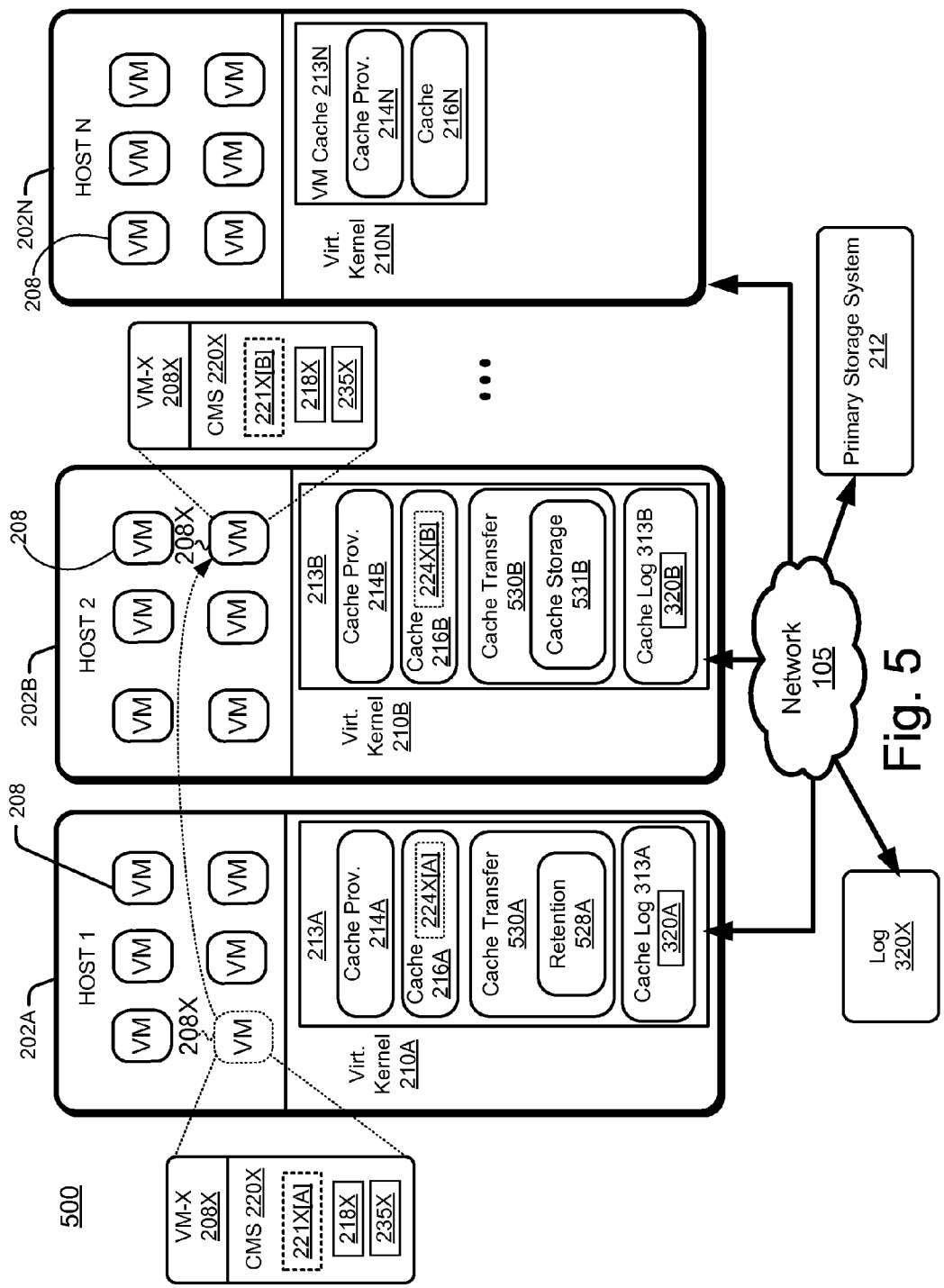
FIG. 5 is a block diagram of another embodiment of a system for persistent cache logging in a virtualized computing environment.

The embodiments disclosed in conjunction with FIGS. 4A-4D may be implemented in the bare metal operating environment 103 of FIG. 1A and/or virtualized computing environments of FIGS. 1B and 1C. FIG. 5 is a block diagram of one embodiment of a system 500 persistent cache logging. The system 500 comprises a virtual computing environment that includes multiple hosts 202A-N, each of which may comprise a respective virtualization kernel 210 supporting one or more virtual machines 208 (as disclosed above in conjunction with FIG. 1B). One or more of the hosts 202A-N may further comprise a respective cache storage module 213A-N, cache virtualization module 233 (not shown), comprising a cache provisioner module 214 and cache 216. Although FIG. 5 depicts three host systems 202A-N, the disclosure is not limited in this regard and could include any number of hosts 202A-N.

Each virtual machine 208 may be assigned a respective VMID. The VMID may be assigned when the virtual machine 208 is instantiated on a host 202A-N (e.g., during an initialization and/or handshake protocol). The VMID may comprise a process identifier, thread identifier, or any other suitable identifier. In some embodiments, the VMID may uniquely identify the virtual machine 208 on a particular host 202A-N and/or within a group of hosts 202A-N. The VMID may comprise an identifier assigned by the virtualization kernel 210, hypervisor, host 202A-N, VMDK disk (VLUN disk 235A-N of FIGS. 1B and 1C), or the like.

In some embodiments, one or more of the virtual machines 208A-N may be capable of being relocated and/or transferred between the hosts 202A-N. For example, a virtual machine 208X may be migrated from the host 202A to the host 202B. The cache storage module 213 and/or cache virtualization module 233 may be configured to migrate the cache state of the virtual machine 208X between hosts (e.g., from the host 202A to the host 202B). Migrating the cache state of the virtual machine 208X may comprise migrating cache metadata (e.g., cache tags 221X[A]) to the host 202B, migrating data of the virtual machine 208X that has been admitted into the cache 216A on the host 202A (cache data 224X[A]), and the like. Transferring the virtual machine 208X from host 202A to host 202B may comprise retaining the cache state of the virtual machine 208X in response to the virtual machine 208X being transferred from the host 202A and/or transferring portions of the cache state to the destination host 202B. Retaining and/or transferring the cache state of the virtual machine 208X may comprise retaining and/or transferring cache metadata (cache tags 221X[A]) and/or cache data 224X[A] of the virtual machine 208X.

In the FIG. 5 embodiment, the virtual machine 208X comprises a CMS 220X which, as disclosed herein, may be configured to selectively service I/O operations of the virtual machine 208X by use of the cache storage module 213A of the host 202A and/or in accordance with cache resources dynamically allocated to the virtual machine 208X (e.g., cache storage 224X[A]). The CMS 220X may comprise an I/O driver and/or filter 218X, which may be configured to monitor I/O operations within the virtual machine 208X and/or provide a communication link (not shown) between the CMS 220X and the cache storage module 213A (via the cache virtualization module, not shown). The CMS 220X may be configured to maintain cache metadata (including the cache tags 221X[A]) in accordance with the cache resources allocated to the virtual machine 208X by the cache provisioner module 214A. As depicted in FIG. 5, the cache tags 221X[A] may be maintained within the virtual machine 208X (e.g., within the local memory space of the virtual machine 208X).

The cache tags 221X[A] may correspond to cache data 224X[A] stored in physical storage locations of the cache 216A (e.g., cache chunks 302 and/or pages 304). The cache data 224X[A] may be associated with identifiers of the cache tags 221X[A] and/or the VMID of the virtual machine 208X by a map module 217, as disclosed above. Transferring the virtual machine 208X to host 202B may comprise transferring a current operating state of the virtual machine 208X, including a current memory image or state of the virtual machine 208X (e.g., stack, heap, virtual memory contents, and so on). Accordingly, in the FIG. 5 embodiment, the cache tags 221X[A] may be automatically transferred to the host 202B with the virtual machine 208X (denoted 221X[B] on host 202B). Transferring the cache tags 221X[A] to host 202B may comprise incorporating the cache tags 221X[B] in accordance with cache resources allocated to the virtual machine 208X on the host 202B, which may comprise adding and/or removing portions of the cache tags 221X[B] on the host 202B, as disclosed above.

As disclosed above, transferring the cache state of the virtual machine 208X may further comprise transferring the cache data 224X[A] to which the cache tags 221X[B] refer. Transferring the cache data 224X[A] may comprise retaining the cache data 224X[A] on the host 202A in response to the virtual machine 208X being transferred therefrom; requesting portions of the retained cache data 224X[A] from the host 202A; and/or transferring portions of the cache data 224X[A] between the hosts 202A and 202B. In some embodiments, the cache storage module 213A may comprise a retention module 528A, which may be configured to retain cache data 224X[A] of the virtual machine 208X after the virtual machine 208X is transferred from the host 202A. The cache data 224X[A] may be retained for a retention period and/or until the cache storage module 213A determines that the retained cache data 224X[A] is no longer needed. The retention module 528A may determine whether to retain the cache data 224X[A] (and/or determine the cache data retention period) based upon various retention policy considerations, including, but not limited to, availability of cache 216A, availability of cache 216B, relative importance of the retained cache data 224X[A] (as compared to cache requirements of other virtual machines 208), whether the cache data 224X[A] is available in the primary storage system 212 (or other backing store), a cache mode and/or persistence level of the cache data 224X[A], and so on.

The cache storage module 213B may comprise a cache transfer module 530B, which may be configured to access cache data 224X[A] of the virtual machine 208X at the previous host 202A. The cache transfer module 530B may be configured to identify the previous host 202A by use of the VMID (e.g., accessing a previous host identifier maintained by the virtual machine 208X), by interrogating the virtual machine 208X, querying the virtualization kernel 210B (or other entity), or the like. The cache transfer module 530B may use the host identifier and/or host addressing information request portions of the retained cache data 224X[A] from the host 202A via the network 105. In some embodiments, the cache transfer module 530B is configured to determine and/or derive a network address and/or network identifier (network name or reference) of the host 202A from the host identifier.

The cache storage module 213A may comprise a cache transfer module 530A that is configured to selectively provide access to retained cache data 224X[A] of the virtual machine 208X. In some embodiments, the cache transfer module 530A is configured to secure the retained cache data 224X[A]. For example, the cache transfer module 530A may be configured to verify that the requesting entity (e.g., the cache storage module 213B) is authorized to access the retained cache data 224X[A], which may comprise verifying that the virtual machine 208X has been deployed on the host 202B and/or verifying that requests for the retained cache data 224X[A] are authorized by the virtual machine 208X (or other authorizing entity). For example, the cache transfer module 530A may request a credential associated with the transferred virtual machine 208X, such as the VMID, or the like. Alternatively, or in addition, the cache transfer module 530A may implement a cryptographic verification, which may comprise verifying a signature generated by the transferred virtual machine 208X, or the like. The cache data 224X[A] may be transferred between the hosts 202A and 202B using various mechanisms, including, but not limited to: push transfers, demand paging transfers, prefetch transfers, bulk transfers, or the like. The cache storage module 531B at host 202B may be configured to selectively admit cache data 224X[A] transferred to the host 202B from host 202A into the cache 224X[B]. The cache storage module 531B may be further configured to populate the cache data 224X[B] from other sources, such as the primary storage system 212, other hosts 202N, or the like. The cache storage module 531B may be configured to associate the cache data 224X[B] with the identifiers of the retained cache tags 221X[B], such that the references in the retained cache tags 221X[B] remain valid per the mappings implemented by the map module 217. Further embodiments of systems and methods for transferring cache state are disclosed in U.S. patent application Ser. No. 13/687,979, entitled "Systems, Methods and Apparatus for Cache Transfers," filed Nov. 28, 2012, and is hereby incorporated by reference.

The cache storage module 213A may comprise a cache log module 313B configured to log cache storage operations performed by the virtual machine 208X (and/or other virtual machines on the host 202A) within a persistent log 320A. Transferring the virtual machine 208X from the host 202A to host 202B may comprise transferring and/or managing the contents of the log 320A.

In some embodiments, the log 320A and the log 320B may be synchronized; the log 320B may comprise a logical or physical standby and/or clone of the log 320A (or vice versa). The cache log module 313A may be configured to log cache storage operations within both logs 320A and 320B (through and/or by use of the cache log module 313B); the cache storage module 213A may acknowledge completion of a write operation (and corresponding I/O request) in response to logging the write operation in both logs 320A and 320B. Alternatively, or in addition, the cache log module 313A may be configured to log cache write operations within a shared log 320X. The shared log 320X may be implemented on a persistent, network-accessible storage device, such as a NAS, SAN, or the like.

In some embodiments, the cache log module 313A and 313B may be configured to maintain separate logs 320A and 320B. Transferring the virtual machine 208X may comprise committing the contents of the log 320A, and resuming cache logging at the host 202B using the cache log module 313B after the transfer is complete. Alternatively, the cache transfer module 530A may be configured to transfer portions of the log 320A to host 202B as cache state data, as disclosed herein.

Figure 6:
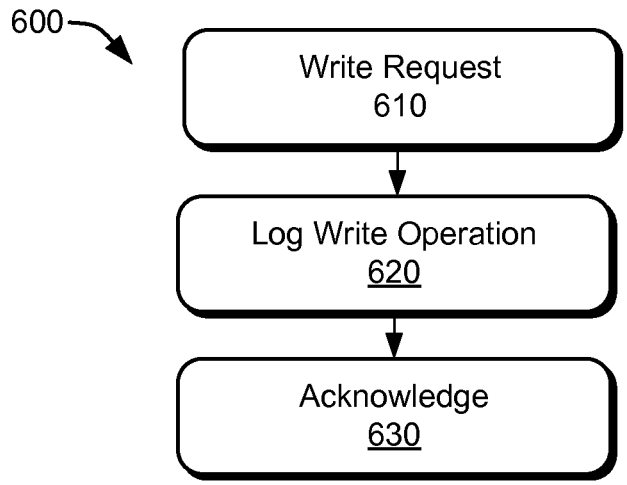
FIG. 6 is a flow diagram of one embodiment of a method for persistent cache logging.

FIG. 6 is a flow diagram of one embodiment of a method 600 for persistent cache logging. One or more of the steps of the method 600, and/or the other methods and/or processes described herein, may be embodied as a computer program product comprising a computer-readable storage medium comprising computer-readable instructions. The instructions may be configured to cause a computing device to perform one or more of the disclosed method steps and/or operations.

Step 610 may comprise receiving a request to write data that has been admitted into a cache. The request of step 610 may be issued by a CMS 220, which may be configured to operate within a bare metal operating environment, a virtual machine 208A-N, and/or a virtualization kernel 210 (e.g., hypervisor). Step 610 may be performed in response to a request to write data that is cached in the cache 216 and/or is associated with one or more cache tags 221 of the CMS 220.

Step 620 may comprise logging a cache write operation corresponding to the write request received at step 610. Step 620 may comprise storing an entry 322 corresponding to the cache write operation in a log 320 maintained on a non-volatile storage device 316. The log 320 may be written sequentially. Accordingly, Step 620 may comprise appending the entry 322 sequentially within a physical address space 416 of the non-volatile storage device 316 (e.g., sequentially at a current append point 328).

The entry 322 may comprise the data that is to be written to the cache 216 (data segment 324) and/or log metadata 325. As disclosed above, the log metadata 325 may include, but is not limited to: an identifier of the data (e.g., logical identifier, logical address, storage I/O address), a backing store identifier, a segment identifier 329A-N, a VMID, a VMDK identifier, and/or the like.

In some embodiments, step 620 comprises appending the entry 322 within a particular log segment 326A-N. Step 620 may further comprise providing an identifier of the particular log segment 326A-N to the CMS 220 to maintain an association between the log 320 and the corresponding cache tag 221 (e.g., using log indicator fields 424 of the cache tags 221, as disclosed herein). In some embodiments, the cache log module 313 may be configured to publish a current log segment identifier to the CMS 220 and/or virtual machines 208A-N. As disclosed above, due to variable I/O rates of different storage clients 104 and/or virtual machines 208A-N, the published log segment may differ from the actual log segment in which the entry 322 is stored. Step 620 may, therefore, comprise providing an updated log indicator value (e.g., sequence indicator) to the CMS 220 if needed.

Step 620 may further comprise performing the write operation to write the data into the cache 216, as disclosed above.

Step 630 may comprise acknowledging completion of the write request of step 610 in response to logging the write operation at step 620. The write request may be acknowledged without writing the data to the primary storage system 212 (and/or other backing store) and/or without writing the data to cache 216.

Figure 7:
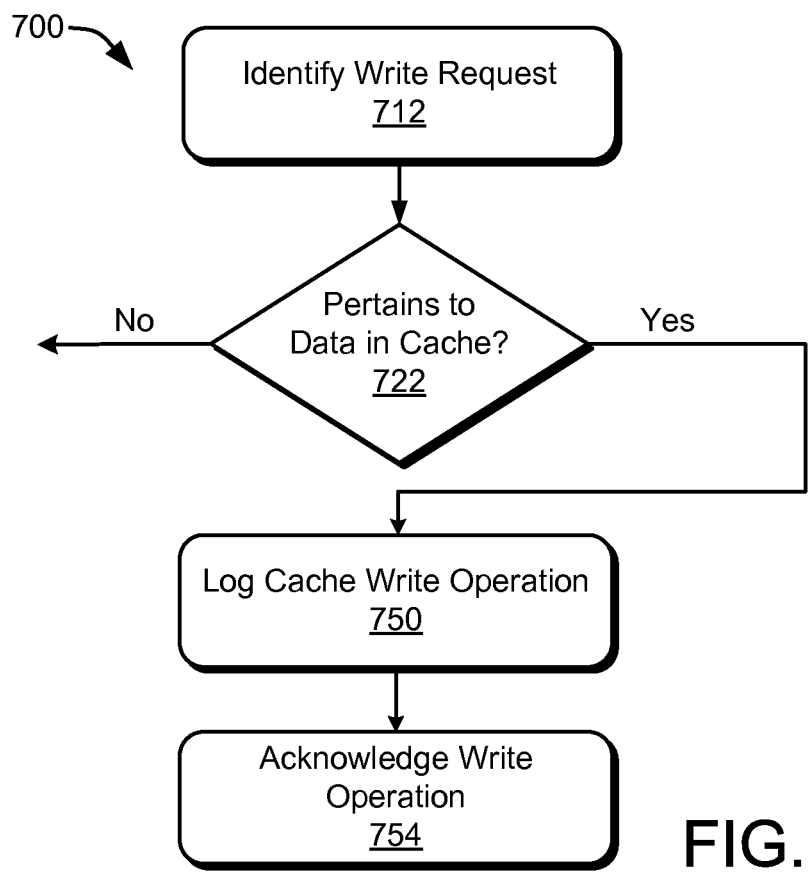
FIG. 7 is a flow diagram of another embodiment of a method for persistent cache logging.

FIG. 7 is a flow diagram of one embodiment of a method 700 for persistent cache logging. Step 712 may comprise identifying a request to write data. The request may be issued by a storage client 104 within a bare metal operating environment 103 and/or a virtual machine 208A-N. The request of step 712 may be identified by use of a storage request module 222 configured to monitor and/or intercept I/O requests within an I/O stack 111. Alternatively, or in addition, the request may be identified by use of an I/O driver 218 and/or filter driver 219 operating within a virtual machine 208A-N or within the virtualization kernel 210.

Step 722 comprises determining whether the identified write request pertains to data in the cache 216. Step 722 may comprise determining whether the CMS 220 includes a cache tag 221 corresponding to the write request. As disclosed above, the cache tags 221 may comprise a translation layer between data identifiers (logical identifiers, storage I/O addresses, etc.) and cache storage locations. Step 722 may comprise determining the storage I/O address of the write request (and/or other identifiers(s)) and determining whether the CMS 220 comprises a corresponding cache tag 221. If no cache tag 221 exists, step 722 may further comprise determining whether to admit the data into the cache using, inter alia, the admission module 247. If the data is to be admitted, step 722 may further comprise allocating one or more cache tags 221 for the write request, as disclosed above. If the write request pertains to data in the cache 216 and/or to data that is to be admitted into the cache 216, the flow may continue to step 750.

Step 750 may comprise logging a cache write operation corresponding to the identified write request. As disclosed above, step 750 may comprise appending an entry 322 at a sequential append point 328. The entry 322 may be associated with a particular log segment 326A-N. Step 750 may further comprise maintaining an association between a cache tag 211 associated with the cache write operation and the particular log segment 326A-N, as disclosed above.

Step 754 may comprise acknowledging completion of the write request in response to logging the cache write operation. The write request may be acknowledged before the write operation is written to the primary storage system 212 (or other backing store).

Figure 8:
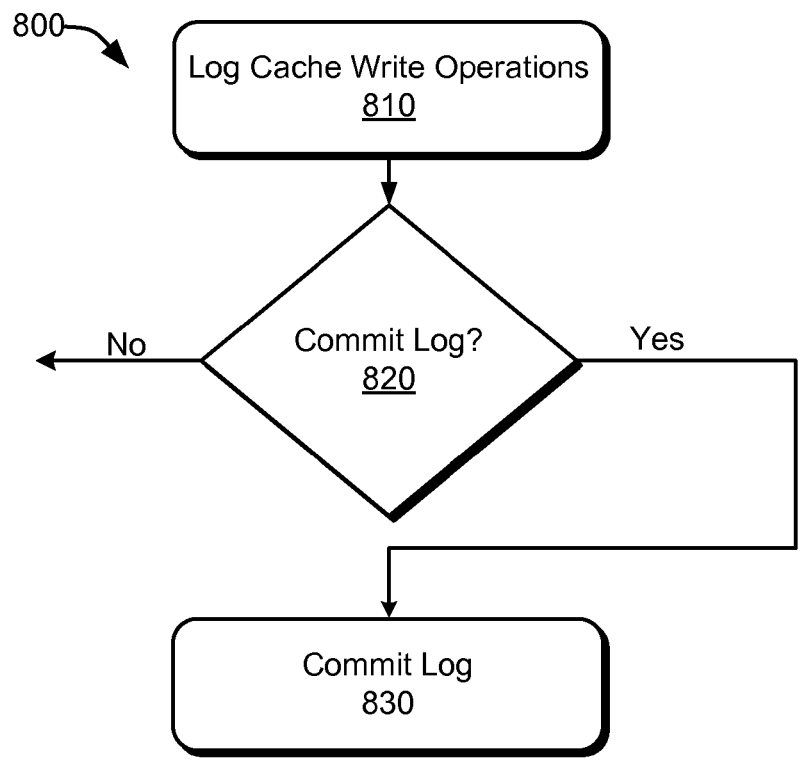
FIG. 8 is a flow diagram of one embodiment of a method for committing a portion of a cache log to a backing store.

FIG. 8 is a flow diagram of another embodiment of a method 800 for persistent cache logging. Step 810 may comprise logging a plurality of cache write operations in a log 320. The cache write operations may be logged in response to write requests pertaining to data in the cache 216, as disclosed above. The cache write operations may be acknowledged in response to recording the cache write operation in the log 320, and before the corresponding data is written to the primary storage system 212 (and/or other backing store).

Step 810 may comprise logging the cache write operations sequentially within the physical address space 416 of the non-volatile storage device 316. Accordingly, step 810 may comprise converting a plurality of write operations to randomly distributed physical addresses and/or data identifiers into more efficient sequential storage operations.

Step 810 may further comprise maintaining mappings between cache tags 221 associated with the cache write operations and corresponding portions of the log 320. In some embodiments, cache logging comprises appending entries 322 within respective segments of the log (e.g., log segments 3326A-N). Step 810 may comprise associating cache tags 221 of the cache write operations with the respective segments using, inter alia, a log indicator field 424 of the cache tags 221, a cache tag index 421, and/or the like, as disclosed above.

Step 820 may comprise determining whether to commit the log 320 (and/or portions thereof). The determination of step 820 may be based on one or more operating and/or triggering conditions, as disclosed above. In some embodiments, the cache log module 313 is configured to commit a current log segment 326A-N in response to filling the log segment 326A-N, incrementing the current log segment 326A-N, or the like. Alternatively, or in addition, the determination of step 820 may be based on load conditions, log capacity thresholds, preferences, configuration, and/or the like. The flow may continue at step 830 in response to determining to commit the log 320 (and/or portion thereof).

Step 830 may comprise committing the log 320 and/or portion thereof. As disclosed above, committing the log may comprise updating the primary storage 212 (and/or other backing store) with cache data written to the log during one or more intervals and/or periods (e.g., within a particular log segment 326A-N). Step 830 may comprise a) determining a current synchronization state of the primary storage system 212, b) identifying portions of the log 320 to commit based on the current synchronization state, c) accessing cache data corresponding to the identified portions of the log 320, and d) writing the accessed cache data to the primary storage system 212. Determining the current synchronization state of the primary storage system 212 may comprise referencing persistent metadata 449 on the primary storage system 212 itself, synchronization metadata 459 maintained by the cache log module 313, or the like. Identifying portions of the log 320 to commit may comprise comparing an endpoint for the commit operation (e.g., up to a certain log segment 326A-N) to the synchronization state of the primary storage system 212. Referring to FIG. 4B, the synchronization state of the primary storage system 212 may be 329N and the endpoint of the commit operation may be the last filled log segment (log segment 326B). Accordingly, the commit operation may comprise committing cache write operations from log segment 326N (per the synchronization state of the primary storage system 212) to the end of log segment 326B. In another embodiment, in which the log segment 326N was not committed to the primary storage system 212, the commit operation may comprise committing cache write operations from the beginning of the log segment 326N to the end of log segment 326B (e.g., committing two log segments 326B-N).

Referring back to FIG. 8, step 830 may comprise accessing cache data corresponding to the identified portions of the log 320. The data may be accessed from the cache 216 rather than the log 320. Accordingly, step 830 may comprise a "scatter gather" operation to data corresponding to the identified log segments. In some embodiments, the scatter gather operation comprises gathering cache tags 221 associated with the identified portions of the log 320. In some embodiments, the cache tags 221 may be gathered by comparing the log indicator fields 424 of the cache tags to segment identifiers of the portions of the log 320 that are being committed. Alternatively, or in addition, the cache tags 221 may be gathered by use of a log indicator index 421, which may be configured to provide an efficient mapping layer between cache tag log indicators 424 and segment identifiers. Step 830 may comprise gathering cache tags 221 from a plurality of different virtual machines 208A-N (from CMS 220A-N of FIG. 1B and/or CMS 220A and CMS 220X of FIG. 1C). Step 830 may further comprise accessing data corresponding to each of the gathered cache tags 221 from cache 216. In some embodiments, the synchronization module 317 may access the data directly in the cache using, inter alia, addressing information provided in the gathered cache tags 221. Alternatively, the data may be read from the cache 216 by the respective CMS 220 (and/or 220A-N, X). As disclosed above, since the cache tags 221 maintain the current version of data associated with each data identifier, gathering the cache tags 221 at step 830 may comprise combining multiple, redundant cache write operations recorded in entries 322 within the log 320 into single, respective cache write operations.

Step 830 may further comprise writing the data accessed from the cache 216 to the primary storage system 212. The synchronization module 317 may be configured to identify the primary storage system 212 (and/or other backing store) associated with the cache data using, inter alia, metadata associated with the gathered cache tags 221, as disclosed above.

In some embodiments, 830 comprises updating synchronization metadata 459 and/or persistent metadata 449 on the primary storage system 212 (and/or other backing stores) to indicate that the identified portions of the log 320 were committed. Step 830 may further comprise erasing, invalidating, and/or reclaiming the committed portions of the log 320, as disclosed above.

Figure 9:
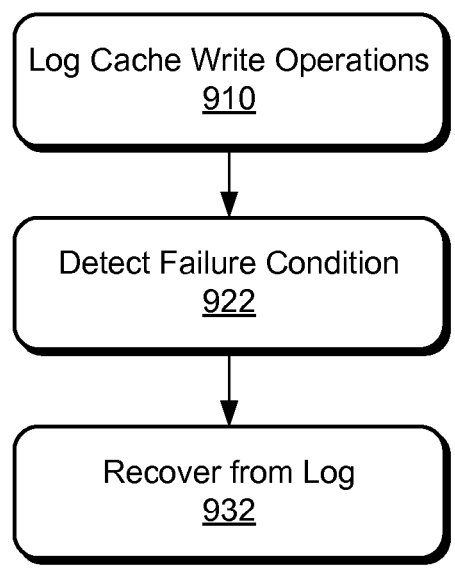
FIG. 9 is a flow diagram of one embodiment of a method for recovering lost cache data in response to a failure condition.

FIG. 9 is a flow diagram of one embodiment of a method 900 for persistent cache logging. Step 910 may comprise logging cache write operations, as disclosed above. Step 922 may comprise detecting a failure condition. The failure condition may be detected by a recovery policy module 319 as disclosed above. The failure condition may result in loss of the contents of the cache 216 and/or cache metadata of the CMS 220 (e.g., cache tags 221).

Step 932 may comprise recovering the lost cache data by use of the log 320. Step 932 may comprise identifying a set of entries 322 in the log 320 corresponding to data that have not been written to the primary storage 212 (and/pr other backing store) and writing the data of the identified set of entries 322 to the primary storage 212. In some embodiments, step 932 may comprise a) determining a synchronization state of the primary storage system 212 (as disclosed above), b) identifying a starting point in the log 320 in accordance with the determined synchronization state (as disclosed above), and c) committing the log 320 from a starting point to an end of the log 320. Committing the log 320 may comprise traversing the log 320 from the starting point. The starting point may correspond to the synchronization state of the primary storage system 212 (and/or other backing store). The starting point may be the entry 322 that immediately follows the last portion of the log 320 that was committed to the primary storage system 212. Referring back to FIG. 4C, the last commit operation on the primary storage system 212 committed log segment 329N and, as such, the starting point may be the entry 432N that immediately follows log segment 326N. Referring back to FIG. 9, traversing the log 320 may comprise accessing the entries 322 in sequential order (from oldest to most recent). The end of the log 320 may be identified in response to, inter alia: accessing invalid entry data (corrupted, malformed, and/or empty data), accessing a log segment 326A-N that is out of sequence, accessing an entry 322 that is out of sequence, or the like, as disclosed above.

In some embodiments, step 932 comprises committing the write operations recorded in the entries 322 as the recovery module 319 traverses the log 320. As disclosed above, performing write operations during the traversal may result in performing more write operations than are actually needed (e.g., performing multiple, redundant write operations). Accordingly, in some embodiments, the step 932 comprises buffering and/or queuing write operations while traversing the log 320, removing redundant and/or obviated write operations, and implementing the remaining operations after the traversal is complete.

Alternatively, or in addition, step 932 may comprise admitting data of the write operations into the cache. The data of the write operations may be admitted during traversal, which may result in redundant write operations being performed. In some embodiments, the recovery module is configured to queue and/or buffer the admission operations during the traversal (in a write buffer 349), remove redundant operations, and implement the remaining operations after the traversal is complete. The recovery module 319 may then commit the contents of the cache to the primary storage system 212, as disclosed above.

Step 932 may further comprise clearing the contents of the log 320, persistent metadata 449, and/or synchronization metadata 459, and resuming cache logging operations, as disclosed herein.

Reference throughout this specification to features, advantages, or similar language does not imply that all of the features and advantages that may be realized are included in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but does not necessarily, refer to the same embodiment.

The embodiments disclosed herein may involve a number of functions to be performed by a computer processor, such as a microprocessor. The microprocessor may be a specialized or dedicated microprocessor that is configured to perform particular tasks according to the disclosed embodiments, by executing machine-readable software code that defines the particular tasks of the embodiment. The microprocessor may also be configured to operate and communicate with other devices such as direct memory access modules, memory storage devices, Internet-related hardware, and other devices that relate to the transmission of data in accordance with various embodiments. The software code may be configured using software formats such as Java, C++, XML (Extensible Mark-up Language) and other languages that may be used to define functions that relate to operations of devices required to carry out the functional operations related to various embodiments.

Within the different types of devices, such as laptop or desktop computers, hand held devices with processors or processing logic, and also computer servers or other devices that utilize the embodiments disclosed herein, there exist different types of memory devices for storing and retrieving information while performing functions according to one or more disclosed embodiments. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to various embodiments when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured disclosed herein enable the physical transformation of these memory devices. Accordingly, the embodiments disclosed herein are directed to novel and useful systems and methods that, in one or more embodiments, are able to transform the memory device into a different state. The disclosure is not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

We claim:

1. A method comprising:
 caching write requests directed to a backing store, the write requests for storing respective write data on the backing store, wherein caching a write request comprises:
  caching write data corresponding to the write request within a first cache storage, the write data designated to be written to the backing store from the first cache storage; and
  storing a redundant copy of the write data cached within the first cache storage on a second, persistent cache storage, separate from the first cache storage, wherein storing the redundant copy of the write data comprises recording a log entry comprising the write data in an ordered sequence of log entries on the second, persistent cache storage, each log entry corresponding to a set of write requests directed to the backing store; and
 maintaining associations between the write data cached within the first cache storage and log entries comprising redundant copies of the write data stored on the second, persistent cache storage.

2. The method of claim 1, further comprising:
 identifying write data cached within the first cache storage that is associated with a selected one of a plurality of log periods recorded on the second, persistent cache storage, each log period comprising one or more log entries corresponding to respective sets of one or more write requests directed to the backing store; and
 writing the identified write data from the first cache storage to the backing store.

3. The method of claim 2, further comprising marking the backing store with an indicator of the selected log period in response to writing the identified write data from the first cache storage to the backing store.

4. The method of claim 1, further comprising:
in response to a failure condition:
identifying a set of log entries recorded on the second, persistent cache storage that are associated with cached write requests that correspond to write data that have not been written to the backing store from the first cache storage; and
transferring write data corresponding to the identified set of log entries to one or more of the first cache storage and the backing store.

5. The method of claim 4, wherein identifying the set of log entries comprises determining an indicator of a last log period committed to the backing store.

6. The method of claim 4, further comprising:
queuing the write data corresponding to the identified set of log entries in a buffer;
removing queued write data made redundant by one or more other write data from the buffer; and
transferring data from the buffer to one or more of the first cache storage and the backing store.

7. The method of claim 4, further comprising admitting write data corresponding to one or more of the identified set of log entries into the first cache storage.

8. An apparatus, comprising:
a request monitor configured to identify write requests directed to a backing store; and
a cache manager configured to cache the identified write requests, wherein to cache the identified write requests, the cache manager is configured to:
admit write data corresponding to the identified write requests into a first cache storage, wherein the write data of the identified write requests are cached within the first cache storage in one or more cache write operations, and wherein the write data admitted into the first cache storage are designated to be written to the backing store from the first cache storage; and
maintain redundant copies of the write data corresponding to the identified write requests within a second cache storage, separate from the first cache storage, the redundant copies comprising log entries stored on a non-volatile storage device of the second cache storage, the log entries corresponding to the one or more cache write operations performed on the first cache storage to admit the write data into the first cache storage;
wherein the request monitor is further configured to acknowledge completion of a write request, of the identified write requests in response to:
completing a cache write operation to admit the write data corresponding to the write request into the first cache storage; and
storing a redundant copy of the write data corresponding to the write request as a log entry on the non-volatile storage device of the second cache storage.

9. The apparatus of claim 8, wherein the cache manager is further configured to store log entries corresponding to the cache write operations performed on the first cache storage sequentially within a physical address space of the non-volatile storage device of the second cache storage.

10. The apparatus of claim 8, wherein the cache manager is further configured to:
divide a log comprising the log into an ordered sequence of log segments, each log segment comprising log entries comprising redundant copies of write data corresponding to a respective group of write requests; and
store the write data associated with the log entries of a selected log segment on the backing store.

11. The apparatus of claim 10, wherein the cache manager is further configured to combine log entries that comprise redundant copies of write data associated with a same data identifier into a single log entry.

12. The apparatus of claim 10, wherein the cache manager is further configured to maintain cache metadata, the cache metadata configured to associate write data admitted into the first cache storage with log segments comprising log entries storing redundant copies of the copies of the write data on the second cache storage.

13. The apparatus of claim 10, wherein the cache manager is further configured to record an indication that the selected log segment has been committed to the backing store in response to writing the write data corresponding to the log entries of the selected log segment to the backing store.

14. The apparatus of claim 10, wherein the cache manager is further configured to: identify a last log segment committed to the backing store; and select the log segment to commit to the backing store based on the determined last log segment.

15. The apparatus of claim 10, wherein the cache manager is further configured to reclaim the selected log segment in response to storing the write data associated with selected log segment on the backing store.

16. The apparatus of claim 8, wherein:
the log entries are stored as an ordered sequence on the non-volatile storage device, each log entry of the ordered sequence comprising a redundant copy of write data admitted into the first cache storage in a respective cache write operation; and the apparatus further comprises
a recovery module configured to access the log entries from a starting entry in the ordered sequence to a last entry in the ordered sequence and to implement write operations corresponding to the accessed log entries on one or more of the backing store and the first cache storage, the starting entry identified based on a synchronization state of the backing store.

17. The apparatus of claim 8, wherein: the request monitor is configured to operate within a virtual machine; and the cache manager is configured to operate within a virtualization kernel.

18. A non-transitory computer-readable storage medium comprising instructions configured to cause a computing system to perform operations, the operations comprising:
caching write-back data responsive to write requests, the write requests corresponding to respective virtual machines of a plurality of virtual machines, the write-back data comprising data to be written to primary storage responsive to the write requests, wherein caching the write-back data of a write request comprises:
performing a first cache write operation to cache the write-back data of the write request within a first cache, the write-back data designated to be written to the primary storage from the first cache;
performing a second cache write operation to store a redundant copy of the write-back data in a second cache, separate from the first cache, wherein performing the second cache write operation comprises appending a log entry comprising the write-back data of the write request to a persistent, ordered log on a non-volatile storage device of the second cache the persistent, ordered log comprising log entries corresponding to respective cache write operations performed on the first cache during respective log periods; and associating the write-back data of the write request cached within the first cache storage with a log period of the persistent, ordered log on the non-volatile storage device of the second cache.

19. The non-transitory computer-readable storage medium of claim 18, wherein:

each of the plurality of virtual machines is configured to maintain cache metadata pertaining to the virtual machine, the cache metadata comprising:

mappings between logical identifiers of the virtual machine and write-back data cached within the first cache; and mappings between the logical identifiers of the virtual machine and respective log periods of the persistent, ordered log, the operations further comprising:

identifying write-back data corresponding to one or more log periods by use of the cache metadata of the virtual machines; and writing the identified write-back data to primary storage.

20. The non-transitory computer-readable storage medium of claim 19, wherein: the one or more log periods comprise log entries corresponding to a plurality of cache write operations pertaining to a particular logical identifier; and the operations further comprise identifying write-back data corresponding to a most recent one of the plurality of cache write operations pertaining to the particular logical identifier within the one or more log periods.

21. The non-transitory computer-readable storage medium of claim 18, the operations further comprising: providing an identifier of a current log period to a virtual machine; and wherein the virtual machine is configured to associate write requests of the virtual machine with the provided identifier.

22. The non-transitory computer-readable storage medium of claim 21, the operations further comprising providing an updated identifier to the virtual machine in response to incrementing the current log period before completion of a particular write request; wherein the virtual machine is configured to associate write-back data of the write request with the updated identifier.

23. The non-transitory computer-readable storage medium of claim 18, the operations further comprising indicating that a request to cache write-back data of a particular write request is complete in response to determining that a log entry comprising the write-back data of the particular write request is stored in the persistent, ordered log on the second cache storage.

* * * * *